United States Patent
Saito et al.

(10) Patent No.: US 11,076,410 B2
(45) Date of Patent: Jul. 27, 2021

(54) USER TERMINAL AND RADIO COMMUNICATION METHOD

(71) Applicant: NTT DOCOMO, INC., Tokyo (JP)

(72) Inventors: Keisuke Saito, Tokyo (JP); Kazuaki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/483,061

(22) PCT Filed: Dec. 1, 2017

(86) PCT No.: PCT/JP2017/043313
§ 371 (c)(1),
(2) Date: Aug. 2, 2019

(87) PCT Pub. No.: WO2018/142747
PCT Pub. Date: Aug. 9, 2018

(65) Prior Publication Data
US 2019/0373596 A1 Dec. 5, 2019

(30) Foreign Application Priority Data
Feb. 3, 2017 (JP) .............................. JP2017-019119

(51) Int. Cl.
*H04W 4/00* (2018.01)
*H04W 72/04* (2009.01)
(Continued)

(52) U.S. Cl.
CPC ......... *H04W 72/048* (2013.01); *H04L 5/0051* (2013.01); *H04L 5/10* (2013.01); *H04W 88/02* (2013.01); *H04L 27/2613* (2013.01)

(58) Field of Classification Search
CPC .. H04W 72/048; H04W 88/02; H04L 5/0051; H04L 5/10; H04L 27/2613; H04L 5/0091;
(Continued)

(56) References Cited

U.S. PATENT DOCUMENTS

| | | | |
|---|---|---|---|
| 2015/0230213 A1* | 8/2015 | Kim | H04L 27/2626 370/329 |
| 2016/0149728 A1* | 5/2016 | Hu | H04L 25/0224 375/267 |

(Continued)

OTHER PUBLICATIONS

3GPP TS 36300 v13.4.0, "Evolved Universal Terrestrial Radio Access (E-UTRA) and Evolved Universal Terrestrial radio Access Network (E-UTRAN); Overall description; Stage 2 (Release 13)," Jun. 2016 (310 pages).

(Continued)

*Primary Examiner* — Chuong T Ho
(74) *Attorney, Agent, or Firm* — Osha Bergman Watanabe & Burton LLP

(57) ABSTRACT

A user terminal includes: a reception section that receives a downlink signal including a demodulation reference signal; a signal separation section that separates the demodulation reference signal from the downlink signal based on an expansion pattern obtained by applying a set expansion method to expand a basic pattern; and a channel estimation section that uses the demodulation reference signal to compute a channel estimation value. The basic pattern indicates resource elements to which a demodulation reference signal of 8 layers is mapped, and the expansion pattern indicates resource elements to which a demodulation reference signal of 16 layers is mapped.

3 Claims, 24 Drawing Sheets

(51) Int. Cl.
  *H04L 5/00* (2006.01)
  *H04L 5/10* (2006.01)
  *H04W 88/02* (2009.01)
  *H04L 27/26* (2006.01)

(58) Field of Classification Search
  CPC ..... H04L 5/0048; H04L 5/001; H04L 5/0023; H04L 27/2611; H04B 7/0413; H04B 7/06
  USPC .................................................. 370/329, 330
  See application file for complete search history.

(56) References Cited

U.S. PATENT DOCUMENTS

| | | | | |
|---|---|---|---|---|
| 2016/0269161 | A1* | 9/2016 | Zhang | H04L 5/0051 |
| 2016/0337019 | A1* | 11/2016 | Chung | H04B 7/0678 |
| 2017/0078006 | A1* | 3/2017 | Liu | H04L 27/2613 |
| 2017/0149520 | A1* | 5/2017 | Zhang | H04J 13/12 |
| 2017/0288835 | A1* | 10/2017 | Kim | H04L 27/2613 |
| 2017/0288837 | A1* | 10/2017 | Namgoong | H04L 5/0007 |
| 2017/0311313 | A1* | 10/2017 | Park | H04L 27/26 |
| 2018/0026684 | A1* | 1/2018 | Wei | H04L 5/0007 370/329 |
| 2018/0054287 | A1* | 2/2018 | Park | H04L 5/0035 |
| 2018/0205484 | A1* | 7/2018 | Zhang | H04L 43/087 |

OTHER PUBLICATIONS

Mitsubishi Electric, "Performance evaluations of DMRS designs for NR MIMO," 3GPP TSG-RAN WG1 NR AH R1-1700875, Jan. 20, 2017 (9 pages).

Mitsubishi Electric, "DMRS designs for NR MIMO," 3GPP TSG-RAN WG1 NR AH R1-1700874, Jan. 20, 2017 (12 pages).

Nokia, Alcatel-Lucent Shanghai Bell, "On the DL DMRS structure of NR physical data channels," 3GPP TSG-RAN WG1 NR Ad-Hoc Meeting R1-1701103, Jan. 20, 2017 (7 pages).

International Search Report issued in corresponding International Application No. PCT/JP2017/043313; dated Feb. 20, 2018 (5 pages).

Written Opinion of the International Searching Authority issued in corresponding International Applicaiton No. PCT/JP2017/043313; dated Feb. 20, 2018 (3 pages).

* cited by examiner

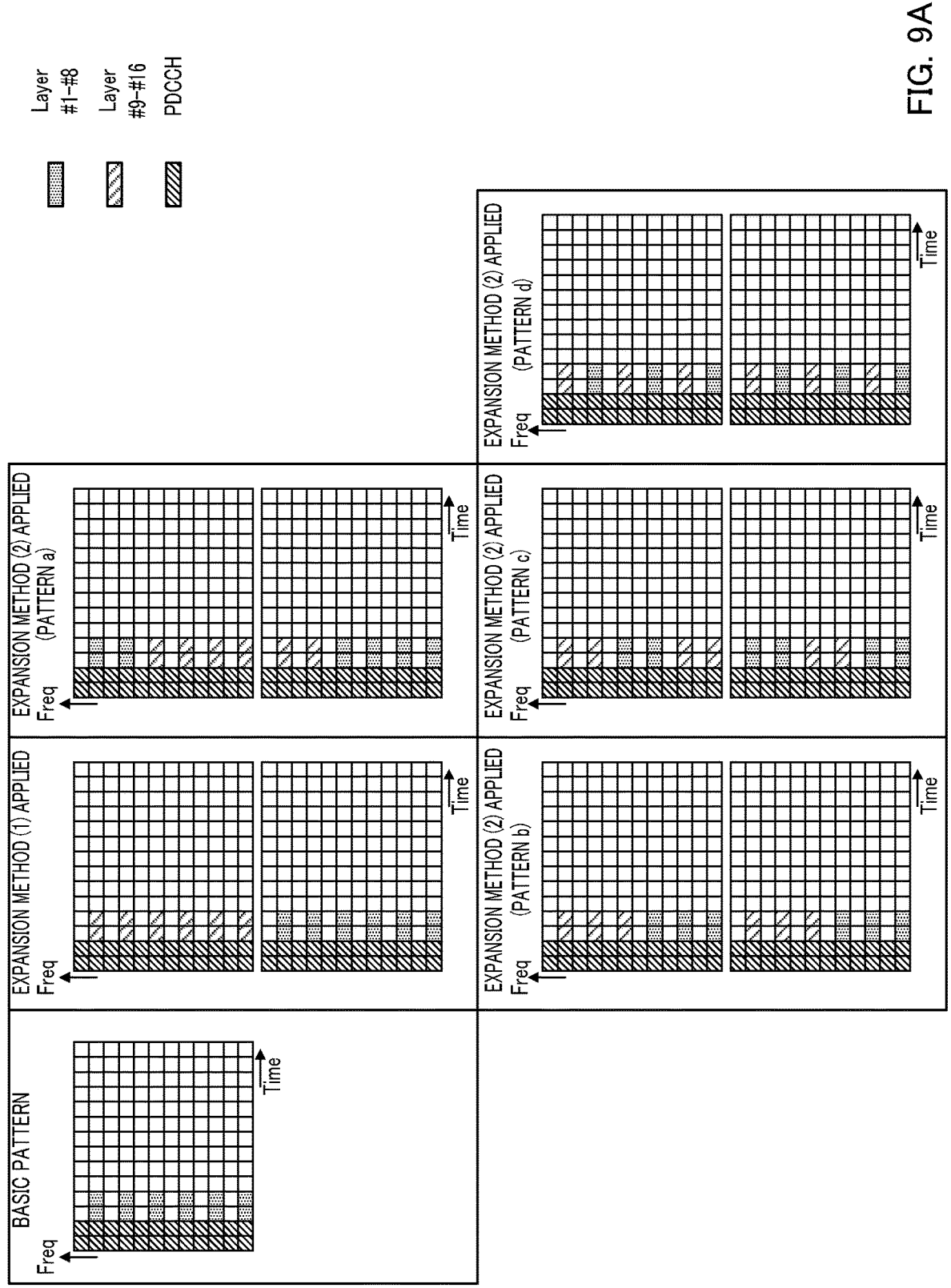

USER TERMINAL AND RADIO COMMUNICATION METHOD

TECHNICAL FIELD

The present invention relates to a user terminal and a radio communication method in a next-generation mobile communication system.

BACKGROUND ART

In a UMTS (Universal Mobile Telecommunications System) network, Long Term Evolution (LTE) is specified for a higher data rate, lower latency, and the like (NPL 1). For a broader bandwidth and a higher speed based on LTE, successor systems of LTE are also studied (for example, the systems are called LTE-A (LTE-Advanced), FRA (Future Radio Access), 5G (5th generation mobile communication system), 5G+ (5G plus), and New-RAT (Radio Access Technology)).

Existing LTE systems (for example, LTE Rel. 8-13) support downlink (DL) transmission and uplink (UL) transmission using a plurality of antenna ports (for example, 8 ports) between a radio base station and a user terminal.

CITATION LIST

Non-Patent Literature

NPL 1 3GPP TS 36.300 v13.4.0, "Evolved Universal Terrestrial Radio Access (E-UTRA) and Evolved Universal Terrestrial Radio Access Network (E-UTRAN); Overall description; Stage 2 (Release 13)," June 2016

SUMMARY OF INVENTION

Technical Problem

Future radio communication systems (for example, 5G) are expected to support 16 antenna ports to meet requests, such as ultra-high speed and large capacity.

However, an appropriate method of expanding the number of antenna ports from 8 ports to 16 ports has not been discussed.

An aspect of the present invention is to provide a user terminal and a radio communication method that can realize a configuration of a reference signal or the like suitable for expanding the number of ports in a future radio communication system.

Solution to Problem

An aspect of the present invention provides a user terminal including: a reception section that receives a downlink signal including a demodulation reference signal; and a control section that controls the reception of the demodulation reference signal from the downlink signal based on an expansion pattern obtained by applying a set expansion method to expand a basic pattern, in which the basic pattern indicates resource elements to which a demodulation reference signal of 8 layers is mapped, and the expansion pattern indicates resource elements to which a demodulation reference signal of 16 layers is mapped.

Advantageous Effects of Invention

According to the aspect of the present invention, the configuration of the reference signal or the like suitable for expanding the number of ports in the future radio communication system can be realized.

BRIEF DESCRIPTION OF DRAWINGS

FIG. 9A illustrates a second example of the basic pattern and the expansion patterns obtained by applying the expansion methods;

DESCRIPTION OF EMBODIMENTS

Embodiment

Figure 1:
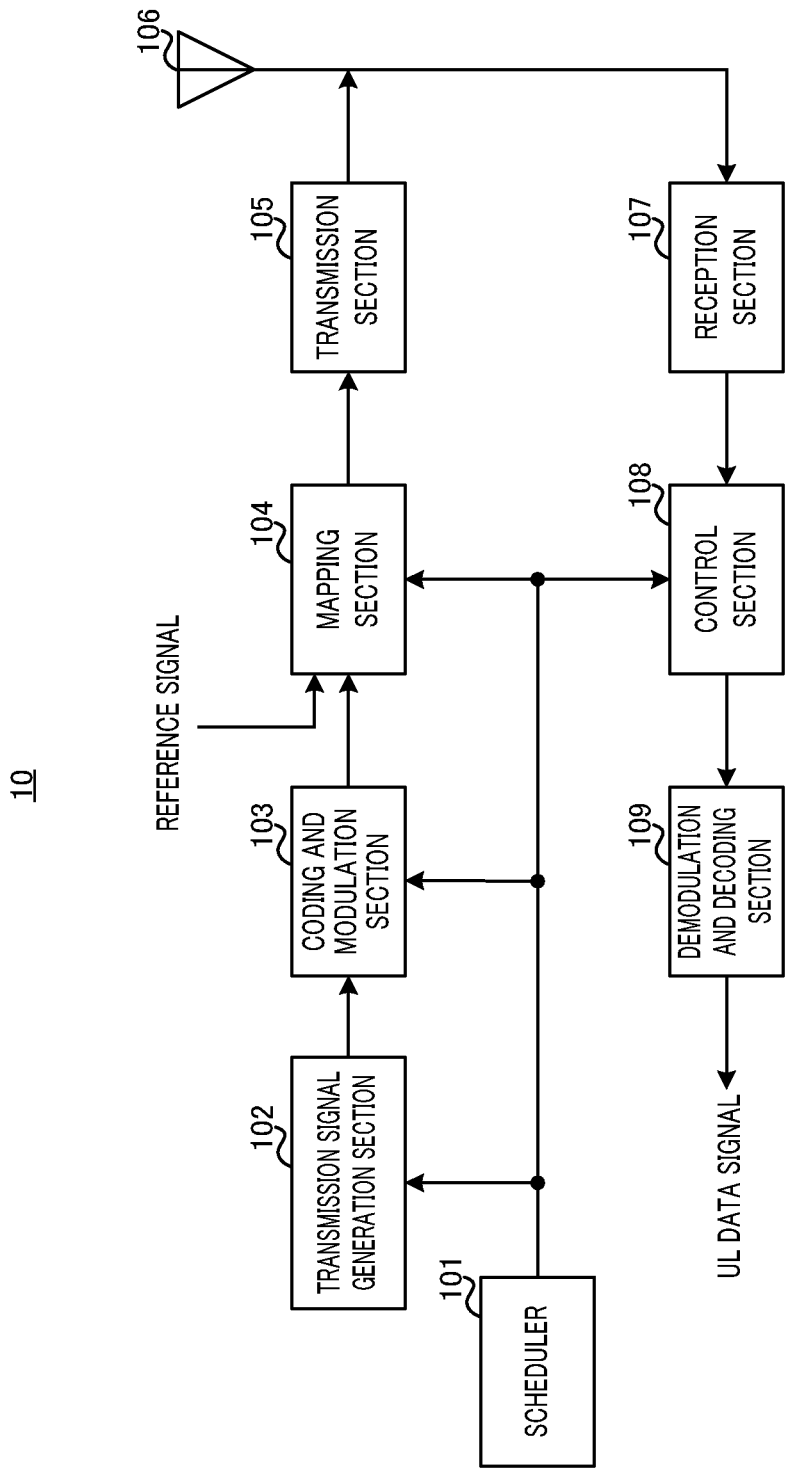
FIG. 1 illustrates an example of an overall configuration of a radio base station according to an embodiment of the present invention.
Figure 2:
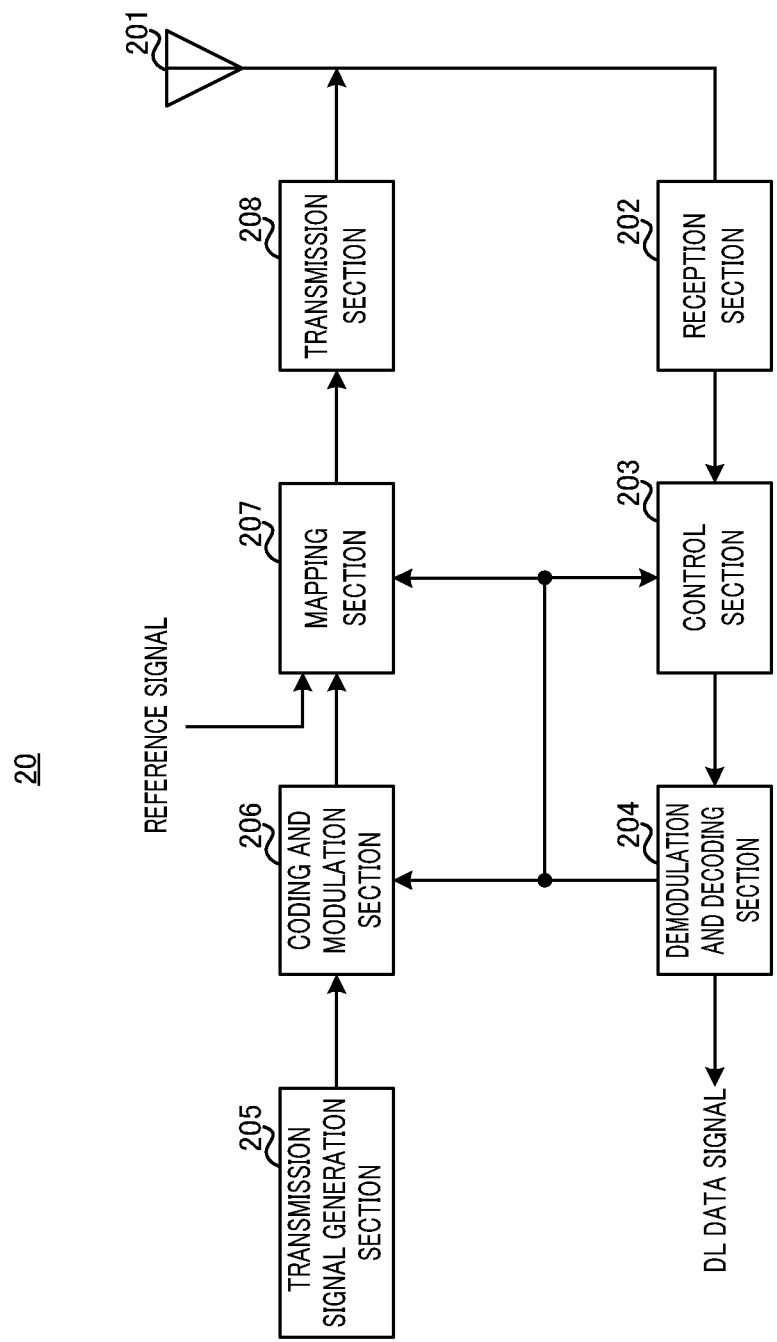
FIG. 2 illustrates an example of an overall configuration of a user terminal according to the embodiment of the present invention.

A radio communication system according to the present embodiment includes at least radio base station 10 shown in FIG. 1 and user terminal 20 shown in FIG. 2. User terminal 20 is connected to (accesses) radio base station 10.

Radio base station 10 uses a downlink control channel (for example, PDCCH: Physical Downlink Control Channel) to transmit a DL control signal to user terminal 20 and uses a downlink data channel (for example, PDSCH: Physical Downlink Shared Channel) to transmit a DL data signal and a demodulation RS to user terminal 20. User terminal 20 uses an uplink control channel (for example, PUCCH: Physical Uplink Control Channel) to transmit a UL control signal to radio base station 10 and uses an uplink data channel (for example, PUSCH: Physical Uplink Shared Channel) to transmit a UL data signal and a demodulation RS to radio base station 10.

Note that the downlink channels and the uplink channels for the transmission and the reception by radio base station 10 and user terminal 20 are not limited to PDCCH, PDSCH, PUCCH, PUSCH, and the like, and the channels may be other channels, such as PBCH (Physical Broadcast Channel) and RACH (Random Access Channel).

In FIGS. 1 and 2, the signal waveform of the DL/UL generated by radio base station 10 and user terminal 20 may be a signal waveform based on OFDM (Orthogonal Frequency Division Multiplexing) modulation, may be a signal waveform based on SC-FDMA (Single Carrier-Frequency Division Multiple Access) or DFT-S-OFDM (DFT-Spread-OFDM), or may be other signal waveforms. In FIGS. 1 and 2, constituent sections (for example, IFFT processing section, CP adding section, CP removing section, and FFT processing section) for generating a signal waveform are not illustrated.

The radio communication system according to the present embodiment supports transmission and reception using 8 antenna ports (8 ports) and supports transmission and reception using 16 antenna ports (16 ports).

An example of transmitting and receiving a signal of 1 layer for 1 port will be described below. In the present embodiment, the transmission and reception of a signal of 8 layers are expanded to the transmission and reception of 16 layers to support the transmission and reception using 16 ports.

Radio Base Station

FIG. 1 illustrates an example of an overall configuration of the radio base station 10 according to the present embodiment. Radio base station 10 shown in FIG. 1 includes scheduler 101, transmission signal generation section 102, coding and modulation section 103, mapping section 104, transmission section 105, antenna 106, reception section 107, control section 108, and demodulation and decoding section 109.

Scheduler 101 performs a scheduling (for example, resource assignment and antenna port assignment) of DL signals (such as DL data signal, DL control signal, and demodulation RS). Scheduler 101 also performs a scheduling (for example, resource assignment and antenna port assignment) of UL signals (such as UL data signal, UL control signal, and demodulation RS).

In the scheduling, scheduler 101 applies a predefined expansion method to expand a mapping pattern indicating resource elements to which a demodulation RS of 8 layers (layer #1 to layer #8) is mapped in one RU (1 RU) to a mapping pattern indicating resource elements to which a demodulation RS of 16 layers (layer #1 to layer #16) is mapped.

Hereinafter, the mapping pattern indicating the resource elements to which the demodulation RS of 8 layers is mapped in 1 RU will be referred to as a basic pattern, and the mapping pattern indicating the resource elements to which the demodulation RS of 16 layers is mapped will be referred to as an expansion pattern.

Scheduler 101 performs a scheduling of the demodulation RS of each layer (that is, layer #1 to layer #16) based on the expansion pattern.

Note that details of the expansion method of the basic pattern will be described later.

Scheduler 101 outputs scheduling information indicating a scheduling result to transmission signal generation section 102, mapping section 104 and control section 108.

Scheduler 101 also configures the MCS (such as code rate and modulation scheme) of the DL data signal and UL data signal based on, for example, the channel quality between radio base station 10 and user terminal 20 and outputs the MCS information to transmission signal generation section 102 and coding and modulation section 103. Note that the MCS may not only be configured by radio base station 10, but may also be configured by user terminal 20. When user terminal 20 configures the MCS, radio base station 10 may receive the MCS information from user terminal 20 (not illustrated).

Transmission signal generation section 102 generates a transmission signal (including a DL data signal and a DL control signal). For example, the DL control signal includes downlink control information (DCI) including the scheduling information (for example, resource assignment information of DL data signal) or the MCS information output from scheduler 101. Transmission signal generation section 102 outputs the generated transmission signal to coding and modulation section 103.

Coding and modulation section 103 performs encoding processing and modulation processing on the transmission signal input from transmission signal generation section 102 based on, for example, the MCS information input from scheduler 101. Coding and modulation section 103 outputs the modulated transmission signal to mapping section 104.

Mapping section 104 maps the transmission signal input from coding and modulation section 103 to a predetermined radio resource (DL resource) based on the scheduling information (for example, resource assignment and/or port assignment of DL) input from scheduler 101. Mapping section 104 also maps the reference signal (for example, demodulation RS) to a predetermined radio resource (DL resource) based on the scheduling information. Mapping section 104 outputs the DL signal mapped to the radio resource to transmission section 105.

Transmission section 105 performs transmission processing, such as up-conversion and amplification, on the DL signal input from mapping section 104 and transmits the radio frequency signal (DL signal) from antenna 106.

Reception section 107 performs reception processing, such as amplification and down-conversion, on the radio frequency signal (UL signal) received by antenna 106 and outputs the UL signal to control section 108.

Control section 108 separates (demaps) the UL data signal and the demodulation RS from the UL signal input from reception section 107 based on the scheduling information (resource assignment and/or port assignment of UL) input from scheduler 101. Control section 108 outputs the UL data signal to demodulation and decoding section 109.

Control section 108 also uses the demodulation RS to perform channel estimation and outputs a channel estimation value as an estimation result to demodulation and decoding section 109.

Demodulation and decoding section 109 performs demodulation and decoding processing on the UL data signal input from control section 108 based on the channel estimation value input from control section 108. Demodulation and decoding section 109 transfers the demodulated UL data signal to an application section (not shown). Note that the application section executes processing and the like related to a layer higher than the physical layer or the MAC layer.

User Terminal

FIG. 2 illustrates an example of the overall configuration of the user terminal 20 according to the present embodiment. User terminal 20 shown in FIG. 2 includes antenna 201, reception section 202, control section 203, demodulation and decoding section 204, transmission signal generation section 205, coding and modulation section 206, mapping section 207, and transmission section 208. User terminal 20 executes reception processing of the radio frequency signal received by the antenna port assigned to user terminal 20.

Reception section 202 performs reception processing, such as amplification and down-conversion, on the radio frequency signal (DL signal) received by antenna 201 and outputs the DL signal to control section 203. The DL signal includes at least the DL data signal and the demodulation RS.

Control section 203 separates (demaps) the DL control signal and the demodulation RS from the DL signal input from reception section 202. Control section 203 then outputs the DL control signal to demodulation and decoding section 205.

In this case, control section 203 controls the reception of the demodulation RS from the DL signal based on the expansion pattern obtained by applying the preset expansion method to expand the basic pattern.

Control section 203 also separates (demaps) the DL data signal from the DL signal based on the scheduling information (for example, DL resource assignment information) input from demodulation and decoding section 204 and outputs the DL data signal to demodulation and decoding section 204.

Control section 203 also uses the separated demodulation RS to perform the channel estimation and outputs a channel estimation value as an estimation result to demodulation and decoding section 204.

Demodulation and decoding section 204 demodulates the DL control signal input from control section 203. Demodulation and decoding section 204 also performs decoding processing (for example, blind detection processing) on the demodulated DL control signal. Demodulation and decoding section 204 outputs the scheduling information (resource assignment of DL/UL or mapping configuration of demodulation RS) addressed to user terminal 20 obtained by decoding the DL control signal to control section 203 and mapping section 207 and outputs the MCS information for the UL data signal to coding and modulation section 206.

Demodulation and decoding section 204 also performs demodulation and decoding processing on the DL data signal input from control section 203 based on the channel estimation value input from control section 203 and the MCS information for the DL data signal included in the DL control signal. Demodulation and decoding section 204 also transfers the demodulated DL data signal to an application section (not illustrated). Note that the application section executes processing and the like related to a layer higher than the physical layer or the MAC layer.

Transmission signal generation section 205 generates a transmission signal (including UL data signal or UL control signal) and outputs the generated transmission signal to coding and modulation section 206.

Coding and modulation section 206 performs encoding processing and modulation processing on the transmission signal input from transmission signal generation section 205 based on, for example, the MCS information input from demodulation and decoding section 204. Coding and modulation section 206 outputs the modulated transmission signal to mapping section 207.

Mapping section 207 maps the transmission signal input from coding and modulation section 206 to a predetermined radio resource (UL resource) based on the scheduling information (resource assignment of UL) input from demodulation and decoding section 204. Mapping section 207 also maps the reference signal (for example, demodulation RS) to a predetermined radio resource (UL resource) based on the scheduling information (for example, mapping configuration of demodulation RS).

Transmission section 208 performs transmission processing, such as up-conversion and amplification, on the UL signal (including at least the UL data signal and the demodulation RS) input from mapping section 207 and transmits the radio frequency signal (UL signal) from antenna 201.

Expansion Methods of Basic Pattern

Next, expansion methods of the basic pattern will be described.

As described, scheduler 101 of radio base station 10 applies a predefined expansion method to expand the basic pattern to the expansion pattern.

Hereinafter, an example of the basic pattern and the expansion patterns obtained by expanding the basic pattern will be illustrated to describe the expansion methods of the basic pattern.

Expansion Method (1)

Figure 3:
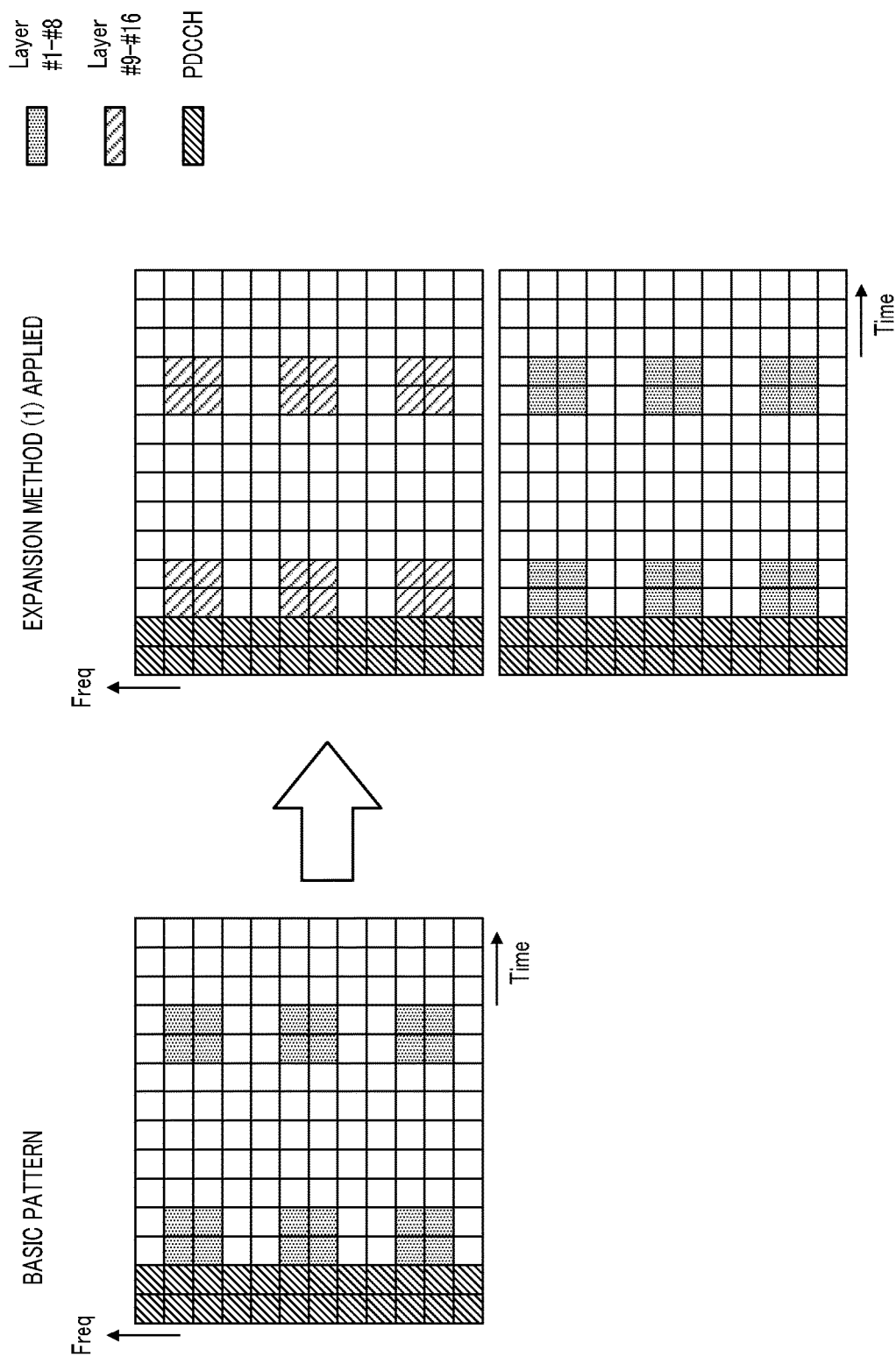
FIG. 3 illustrates an example of expansion method (1) according to the embodiment of the present invention.

FIG. 3 illustrates an example of expansion method (1) according to the present embodiment. FIG. 3 shows a basic pattern and an expansion pattern obtained by applying expansion method (1) to expand the basic pattern.

The basic pattern illustrated in FIG. 3 shows mapping positions of the control channel (PDCCH) and the demodulation RS (layers #1 to #8) of 8 layers (Layer #1 to Layer #8) in a resource unit (RU) (also called a resource block, a resource block pair, or the like) that is resource assignment unit. 1 RU includes 168 resource elements (REs) constituted by 12 resource elements in the frequency direction and 14 resource elements in the time direction. 1 RE is a radio resource region defined by 1 subcarrier and 1 symbol. Therefore, 1 RU in FIG. 3 is constituted by 12 subcarriers and 14 symbols.

The expansion pattern obtained by applying the expansion method (1) indicates resource elements to which the control channel (PDCCH), the demodulation RS of 8 layers (layer #1 to layer #8), and the demodulation RS (layers #9 to #16) of 8 layers (Layer #9 to Layer #16) are mapped.

Note that layer #1 to layer #8 will be referred to as a first layer group, and layer #9 to layer #16 will be referred to as a second layer group.

In the expansion pattern obtained by applying expansion method (1), frequency division multiplexing (FDM) is used in 2 RUs to multiplex the demodulation RS of the first layer group and the demodulation RS of the second layer group.

Specifically, the demodulation RS of the first layer group is mapped to the resource elements indicated by the basic pattern in 1 RU. The demodulation RS of the second layer group is mapped to the resource elements indicated by the basic pattern in an RU (for example, adjacent RU in the frequency direction) different from the RU to which the demodulation RS of the first layer group is mapped.

Note that the multiplexing method of the demodulation RS of 8 layers in the first layer group is not particularly limited. The demodulation RS of 8 layers (Layer #1 to Layer #8) may be multiplexed by using a multiplexing method of one or a combination of two or more of code division multiplexing (CDM), time division multiplexing (TDM), and FDM. The multiplexing method of the demodulation RS of 8 layers in the second layer group is also not particularly limited. The demodulation RS of 8 layers (Layer #9 to Layer #16) may be multiplexed by one or a combination of two or more of CDM, TDM, and FDM.

According to expansion method (1) as shown in FIG. 3, the number of multiplexing layers of the demodulation RS in the same resource elements is reduced compared to the data channel, and the power can be boosted.

Expansion Method (2)

Figure 4:
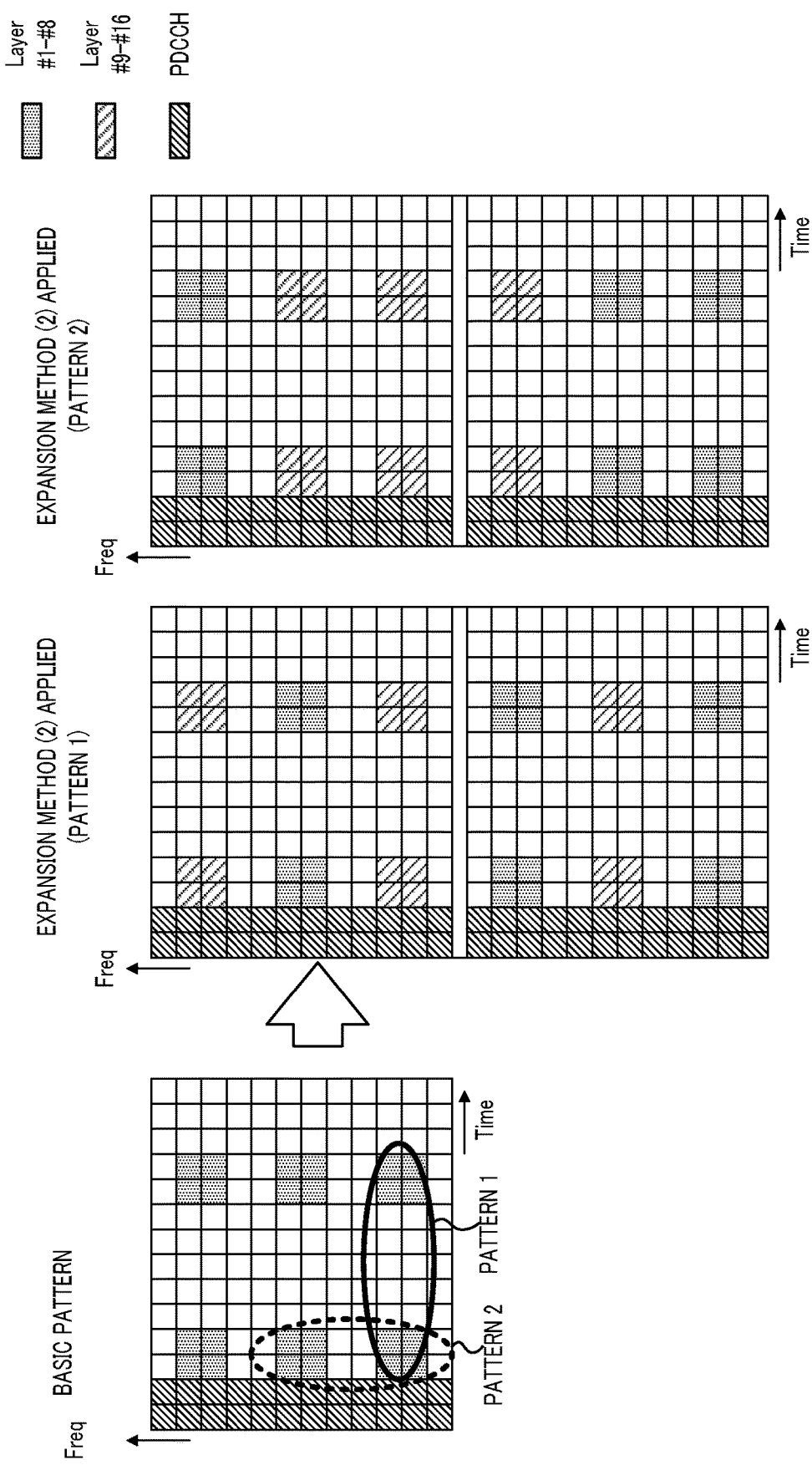
FIG. 4 illustrates an example of expansion method (2) according to the embodiment of the present invention.

FIG. 4 illustrates an example of expansion method (2) according to the present embodiment. FIG. 4 shows a basic pattern and two expansion patterns obtained by applying expansion method (2) to expand the basic pattern.

The basic pattern indicates resource elements to which the control channel (PDCCH) and the demodulation RS of the first layer group (Layer #1 to Layer #8) are mapped. The expansion patterns expanded by applying expansion method (2) indicate resource elements to which the control channel (PDCCH), the demodulation RS of the first layer group, and the demodulation RS of the second layer group (Layer #9 to Layer #16) are mapped. Note that the basic pattern of FIG. 4 is the same as the basic pattern shown in FIG. 3.

In the expansion patterns obtained by applying expansion method (2), FDM is used in 2 RUs to multiplex the demodulation RS of the first layer group and the demodulation RS of the second layer group.

Specifically, in the expansion patterns obtained by applying expansion method (2), 2 RUs are used to map the demodulation RS of 16 layers as in the expansion pattern obtained by applying expansion method (1). In the expansion patterns obtained by applying expansion method (2), part of the mapping position of the demodulation RS of the first layer group and part of the mapping position of the demodulation RS of the second layer group in the expansion pattern obtained by applying expansion method (1) are replaced with each other.

In the replacement of part of the mapping position of the demodulation RS of the first layer group and part of the mapping position of the demodulation RS of the second layer group, it is desirable to replace the parts with each other in consideration of the range of the CDM of the first layer group.

For example, pattern 1 and pattern 2 as ranges of the CDM are illustrated in the basic pattern of FIG. 4. The parts are replaced with each other in consideration of pattern 1 or pattern 2 to expand the basic pattern to expansion pattern 1 and expansion pattern 2 by applying expansion method (2).

According to expansion method (2) as shown in FIG. 4, the number of multiplexing layers of the demodulation RS in the same resource elements is reduced compared to the data channel, and the power can be boosted. Furthermore, the mapped demodulation RS of each layer is extended in the frequency direction, and this increases the resistance to the frequency-selective channel.

Note that the replacement of part of the mapping position of the demodulation RS of the first layer group and part of the mapping position of the demodulation RS of the second layer group in FIG. 4 is just an example. The positions to be replaced are not particularly limited.

Expansion Method (3)

Figure 5:
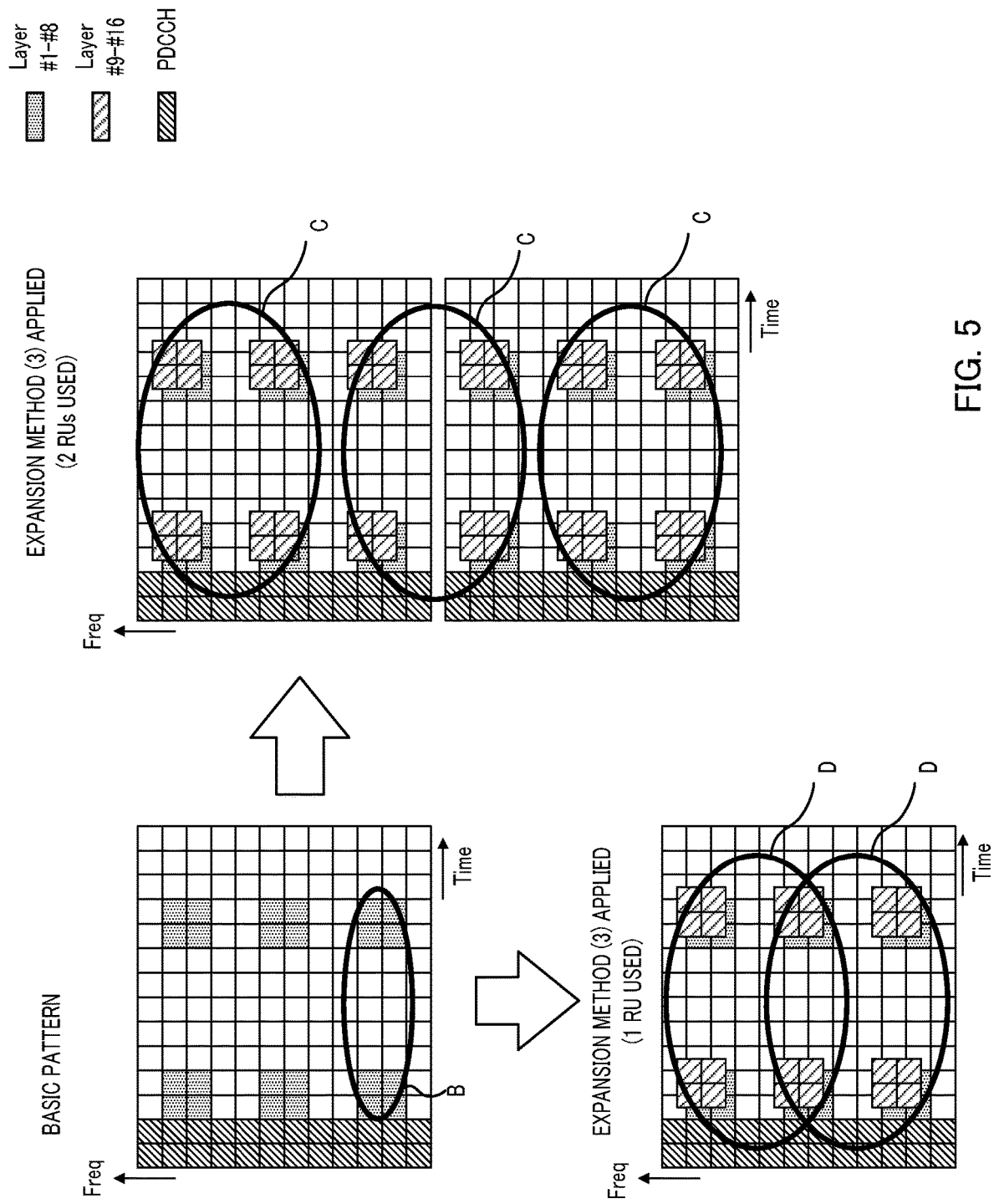
FIG. 5 illustrates an example of expansion method (3) according to the embodiment of the present invention.

FIG. 5 illustrates an example of expansion method (3) according to the present embodiment. FIG. 5 shows a basic pattern and two expansion patterns obtained by applying expansion method (3) to expand the basic pattern.

The basic pattern indicates resource elements to which the control channel (PDCCH) and the demodulation RS of the first layer group (Layer #1 to Layer #8) are mapped. The two expansion patterns expanded by applying expansion method (3) indicate resource elements to which the control channel (PDCCH), the demodulation RS of the first layer group, and the demodulation RS of the second layer group (Layer #9 to Layer #16) are mapped. Note that the basic pattern of FIG. 5 is the same as the basic pattern shown in FIG. 3.

In the expansion pattern obtained by applying expansion method (3), the CDM is used in 2 or 1 RU to multiplex the demodulation RS of the first layer group and the demodulation RS of the second layer group.

Specifically, when 2 RUs are used, the CDM is used to multiplex the demodulation RS of the first layer group and the demodulation RS of the second layer group in the resource elements indicated by the basic pattern in each of the 2 RUs (adjacent in the frequency direction). In this case, the sequence used for the CDM is a sequence twice the length of the sequence used to multiplex the demodulation RS of 8 layers by using the CDM.

The range of the CDM is increased by using the sequence twice the length to multiplex the demodulation RS. For example, range B as a range of the CDM of 8 layers is indicated in the basic pattern of FIG. 5. With respect to range B, ranges C as ranges of the CDM of 16 layers are indicated in the expansion patterns obtained by using 2 RUs and applying expansion method (3).

When 1 RU is used, the CDM is used to multiplex the demodulation RS of the first layer group (Layer #1 to Layer #8) and the demodulation RS of the second layer group (Layer #9 to Layer #16) on the resource elements indicated by the basic pattern in 1 RU. In this case, the sequence used for the CDM is a sequence twice the length of the sequence used to multiplex the demodulation RS of 8 layers by using the CDM. Since the demodulation RS of the first layer group (Layer #1 to Layer #8) and the demodulation RS of the second layer group (Layer #9 to Layer #16) are multiplexed in 1 RU, part of the demodulation RS is multiplexed for multiple times. Therefore, the sequence is calculated multiple times for part of the demodulation RS.

For example, in the case of FIG. 5, the expansion pattern obtained by using 1 RU and applying expansion method (3) indicates ranges D as ranges of the CDM of 16 layers. The CDM is used multiple times to multiplex the demodulation RS in the resource elements to which the demodulation RS included in both of two ranges D is mapped.

According to expansion method (3) as shown in FIG. 5, the number of multiplexing layers of the demodulation RS in the same resource elements is reduced compared to the data channel, and the power can be boosted. Furthermore, the mapped demodulation RS is extended in the frequency direction, and this increases the resistance to the frequency-selective channel.

Expansion Method (4)

Figure 6:
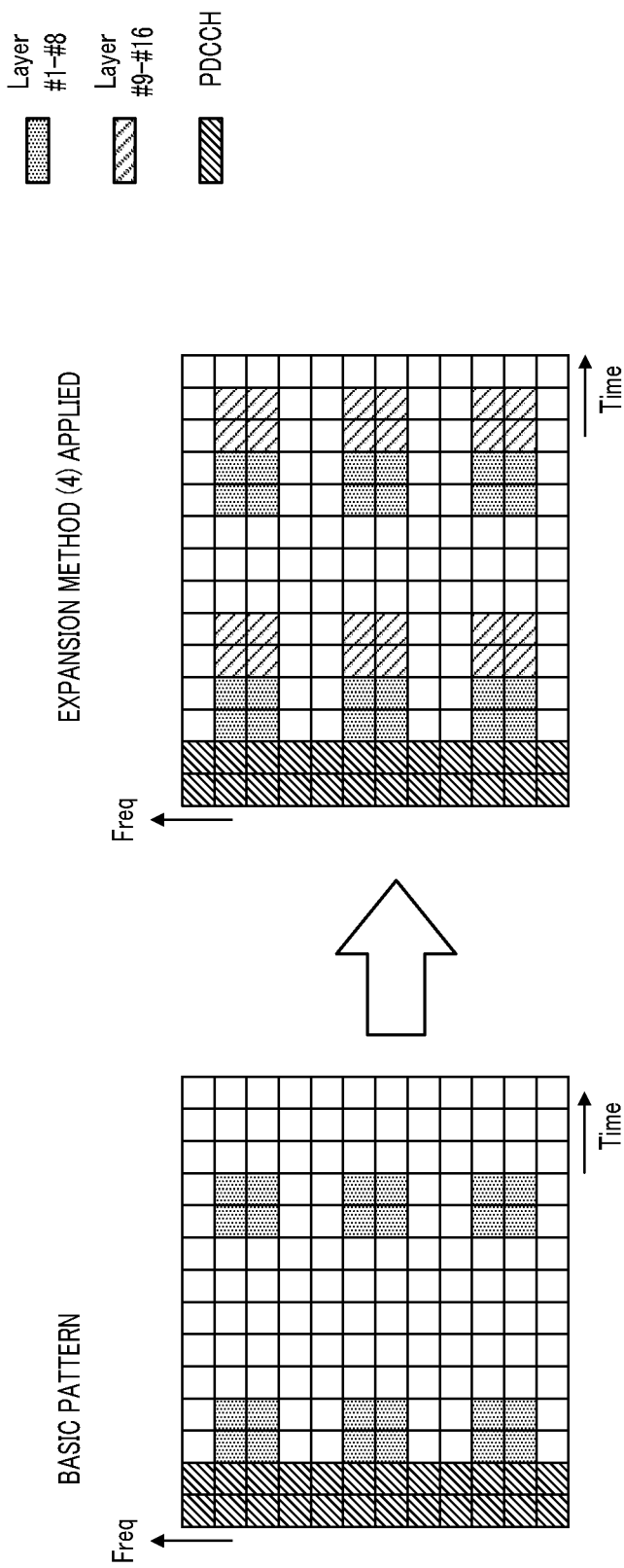
FIG. 6 illustrates an example of expansion method (4) according to the embodiment of the present invention.

FIG. 6 illustrates an example of expansion method (4) according to the present embodiment. FIG. 6 shows a basic pattern and an expansion pattern obtained by applying expansion method (4) to expand the basic pattern.

The basic pattern indicates resource elements to which the control channel (PDCCH) and the demodulation RS of the first layer group (Layer #1 to Layer #8) are mapped. The expansion pattern expanded by applying expansion method (4) indicates resource elements to which the control channel (PDCCH), the demodulation RS of the first layer group, and the demodulation RS of the second layer group (Layer #9 to Layer #16) are mapped. Note that the basic pattern of FIG. 6 is the same as the basic pattern shown in FIG. 3.

In the expansion pattern obtained by applying expansion method (4), TDM is used in 1 RU to multiplex the demodulation RS of the first layer group and the demodulation RS of the second layer group.

Specifically, the demodulation RS of the first layer group is mapped to the resource elements indicated by the basic pattern in 1 RU. In the same RU, the demodulation RS of the second layer group is mapped to the resource elements where the resource elements indicated in the basic pattern are shifted in the time direction without overlapping with the resource elements to which the demodulation RS of the first layer group is mapped.

According to expansion method (4) as shown in FIG. 6, the channel estimation accuracy using the demodulation RS of the second layer group and the channel estimation accuracy using the demodulation RS of the first layer group can be equivalent to the channel estimation accuracy using the demodulation RS mapped based on the basic pattern. Since the demodulation RS of 16 layers can be mapped in 1 RU, the number of RUs used in the expansion can be reduced.

Note that FIG. 6 illustrates an example in which the demodulation RS of the first layer group is mapped adjacent to the demodulation RS of the second layer group in the time direction without a gap in the expansion pattern obtained by applying expansion method (4). However, an interval of one or more resource elements may be provided in the time direction between the demodulation RS of the first layer group and the demodulation RS of the second layer group.

Expansion Method (5)

Figure 7:
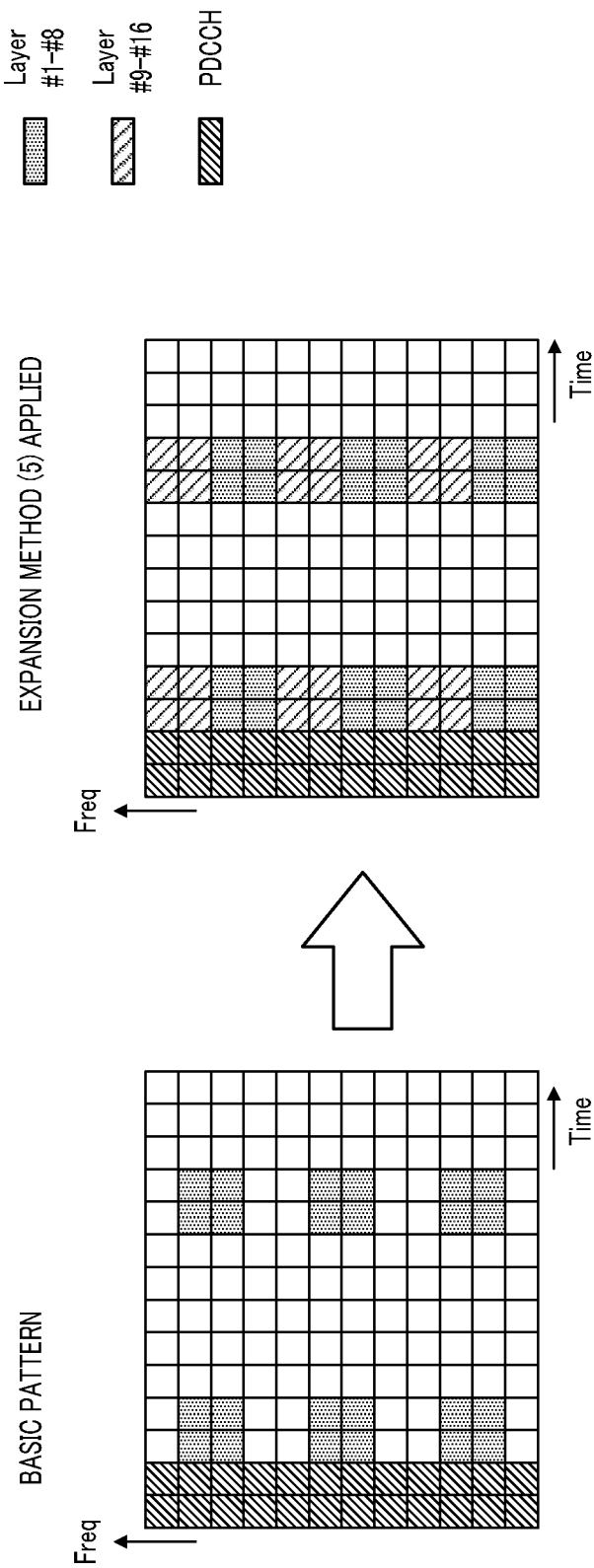
FIG. 7 illustrates an example of expansion method (5) according to the embodiment of the present invention.

FIG. 7 illustrates an example of expansion method (5) according to the present embodiment. FIG. 7 shows a basic pattern and an expansion pattern obtained by applying expansion method (5) to expand the basic pattern.

The basic pattern indicates resource elements to which the control channel (PDCCH) and the demodulation RS of the first layer group (Layer #1 to Layer #8) are mapped. The expansion pattern expanded by applying expansion method (5) indicates resource elements to which the control channel (PDCCH), the demodulation RS of the first layer group, and the demodulation RS of the second layer group (Layer #9 to Layer #16) are mapped. Note that the basic pattern of FIG. 7 is the same as the basic pattern shown in FIG. 3.

In the expansion pattern obtained by applying expansion method (5), FDM is used in 1 RU to multiplex the demodulation RS of the first layer group and the demodulation RS of the second layer group.

Specifically, the demodulation RS of the first layer group is mapped to the resource elements where the resource elements indicated in the basic pattern are shifted by 1 resource element toward the low frequency (downward in FIG. 7) in the frequency direction in 1 RU. In the same RU, the demodulation RS of the second layer group is mapped to the resource elements where the resource elements indicated in the basic pattern are shifted in the frequency direction without overlapping with the resource elements to which demodulation RS of the first layer group is mapped.

In expansion method (5) as shown in FIG. 7, the channel estimation accuracy using the demodulation RS of the second layer group and the channel estimation accuracy using the demodulation RS of the first layer group can be equivalent to the channel estimation accuracy using the demodulation RS mapped based on the basic pattern. Since the demodulation RS of 16 layers can be mapped in 1 RU, the number of RUs used in the expansion can be reduced.

Note that FIG. 7 illustrates an example in which the demodulation RS of the first layer group is mapped adjacent to the demodulation RS of the second layer group in the frequency direction without a gap in the expansion pattern obtained by applying expansion method (5). The present invention is not limited to this. For example, an interval of one or more resource elements may be provided in the frequency direction between the demodulation RS of the first layer group and the demodulation RS of the second layer group.

FIG. 7 illustrates an example in which the demodulation RS of the first layer group is mapped to the resource elements where the resource elements indicated in the basic pattern are shifted by 1 resource element toward the low frequency (downward in FIG. 7) in the frequency direction. The present invention is not limited to this. For example, the shifting direction may be toward the high frequency, or the resource elements may be shifted by two or more resource elements. Alternatively, the demodulation RS of the first layer group may be mapped without shifting the resource elements indicated in the basic pattern.

Figure 8:
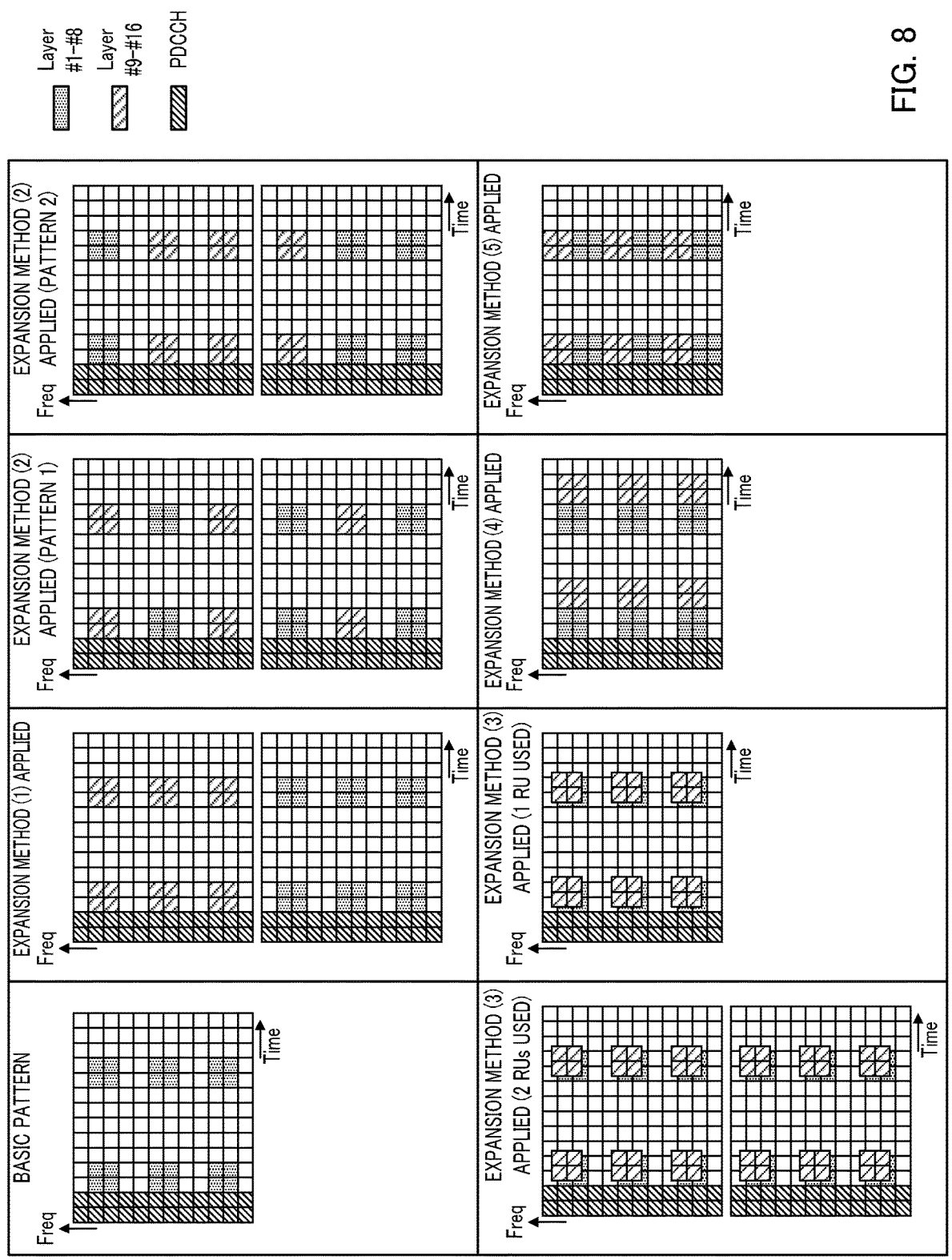
FIG. 8 illustrates a first example of a basic pattern and expansion patterns obtained by applying the expansion methods.

FIG. 8 collectively shows the basic pattern and the expansion patterns illustrated in FIGS. 3 to 7. FIG. 8 illustrates a first example of the basic pattern and the expansion patterns obtained by applying the expansion methods.

As described, the method of applying one of expansion method (1) to expansion method (5) respectively illustrated in FIGS. 3 to 7 to expand the basic pattern is used to expand the mapping pattern (basic pattern) indicating the resource elements to which the demodulation RS of 8 layers is mapped to the mapping pattern (expansion pattern) indicating the resource elements to which the demodulation RS of 16 layers is mapped.

Note that FIGS. 3 to 7 illustrate the expansion patterns expanded by applying the expansion methods to the same basic pattern. The basic pattern is not limited to the illustrated pattern, and various basic patterns may be used. Hereinafter, an example of a variation of the basic pattern and expansion patterns expanded by applying expansion method (1) to expansion method (5) to the basic pattern will be described in variation 1.

Variation 1

Figure 9B:
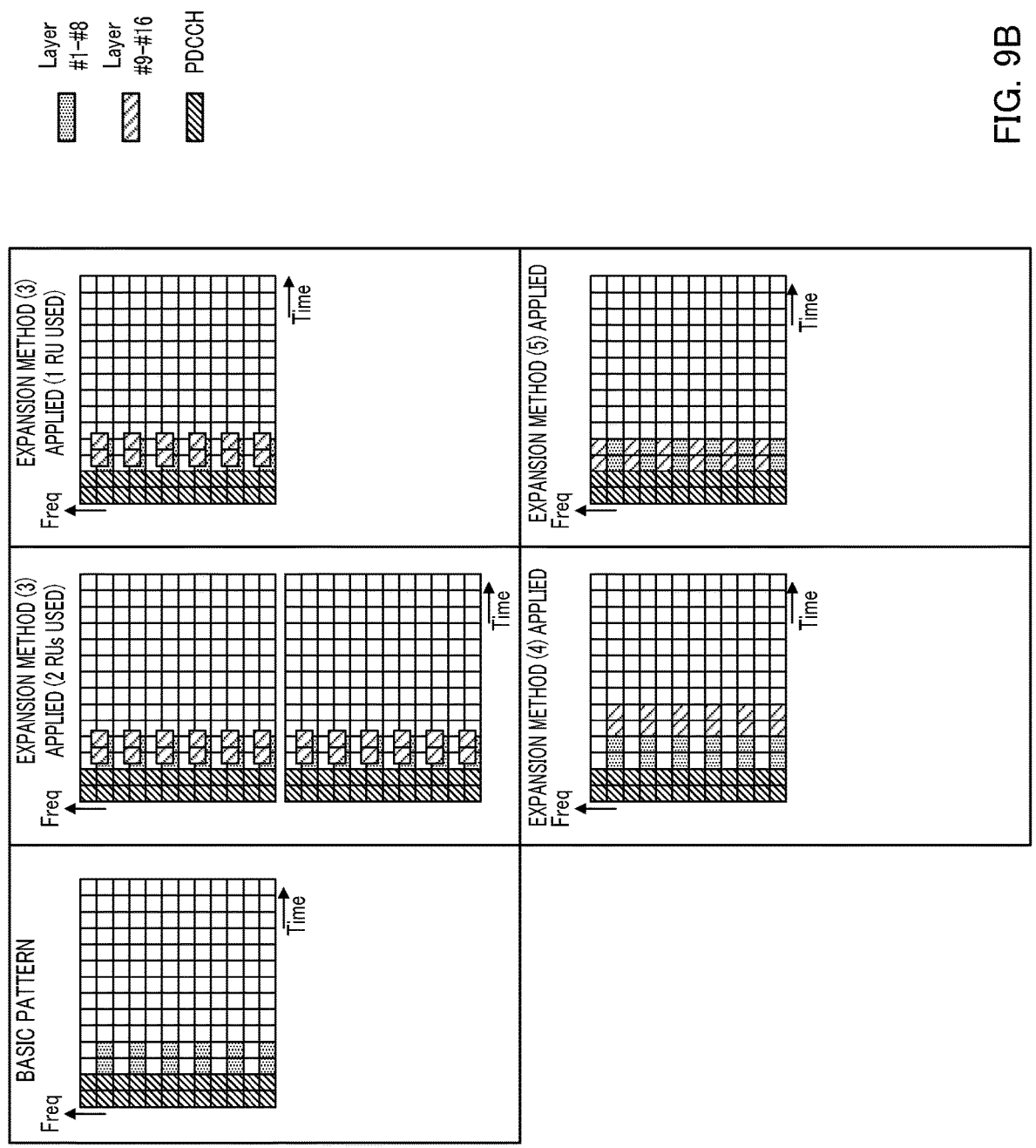
FIG. 9B illustrates the second example of the basic pattern and the expansion patterns obtained by applying the expansion methods.
Figure 10:
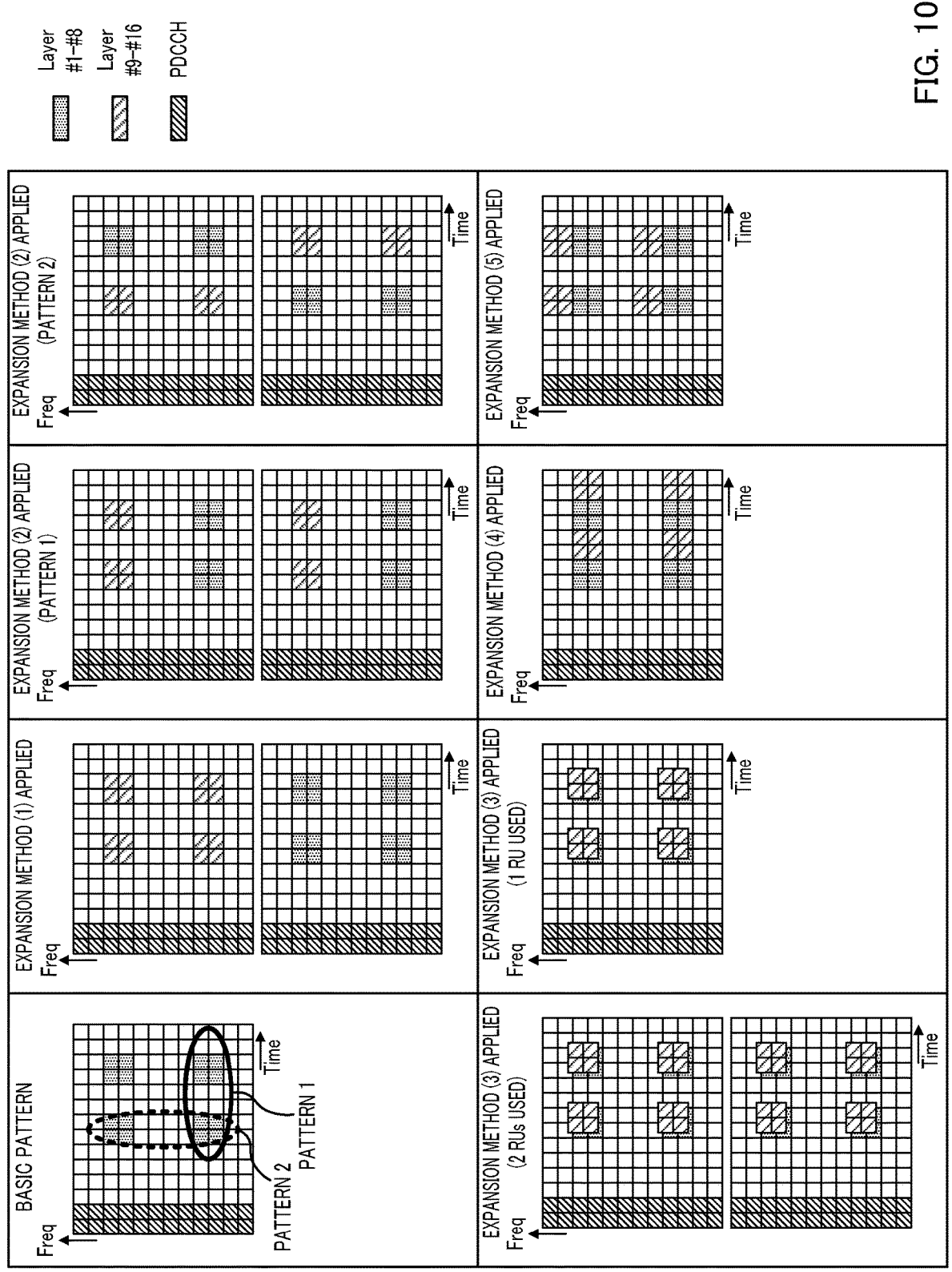
FIG. 10 illustrates a third example of the basic pattern and the expansion patterns obtained by applying the expansion methods.
Figure 11:
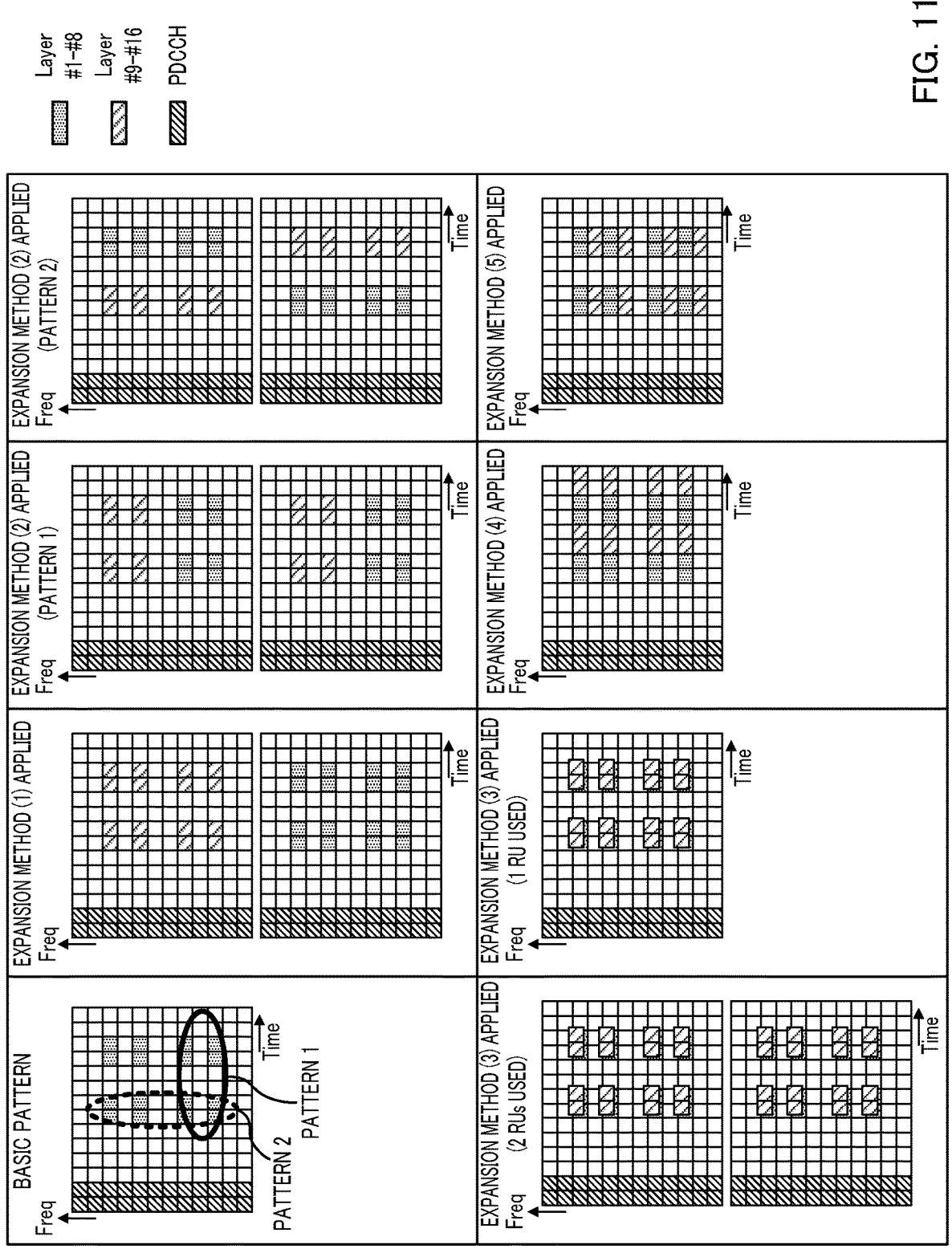
FIG. 11 illustrates a fourth example of the basic pattern and the expansion patterns obtained by applying the expansion methods.

FIGS. 9A and 9B illustrate a second example of the basic pattern and the expansion patterns obtained by applying the expansion methods. FIG. 10 illustrates a third example of the basic pattern and the expansion patterns obtained by applying the expansion methods. FIG. 11 illustrates a fourth example of the basic pattern and the expansion patterns obtained by applying the expansion methods.

FIGS. 9A, 9B, 10, and 11 illustrate the basic pattern and the expansion patterns obtained by applying expansion method (1) to expansion method (5) to expand the basic pattern. Note that FIGS. 9A and 9B separately illustrate the same basic pattern and the expansion patterns obtained by expanding the basic pattern. The basic pattern indicates resource elements to which the control channel (PDCCH) and the demodulation RS of the first layer group (Layer #1 to Layer #8) are mapped, and the expansion patterns expanded by applying the expansion methods indicate resource elements to which the control channel (PDCCH), the demodulation RS of the first layer group, and the demodulation RS of the second layer group (Layer #9 to Layer #16) are mapped. A plurality of patterns are illustrated for the example in which a plurality of different patterns are obtained when expansion method (2) is applied.

As shown in FIGS. 9A, 9B, 10, and 11, the expansion methods can be applied to expand one basic pattern to various expansion patterns.

Note that depending on the basic pattern, part of expansion methods (1) to (5) may be applied instead of all of expansion methods (1) to (5). Hereinafter, basic patterns for which part of expansion methods (1) to (5) are applied and expansion patterns obtained by expanding the basic patterns will be described in variation 2 and variation 3.

Variation 2

For example, expansion methods (1) to (4) are applied when the number of resource elements for mapping the demodulation RS of 8 layers is relatively large (dense) in the frequency direction in the basic pattern. An example of applying expansion methods (1) to (4) will be described below.

Figure 12A:
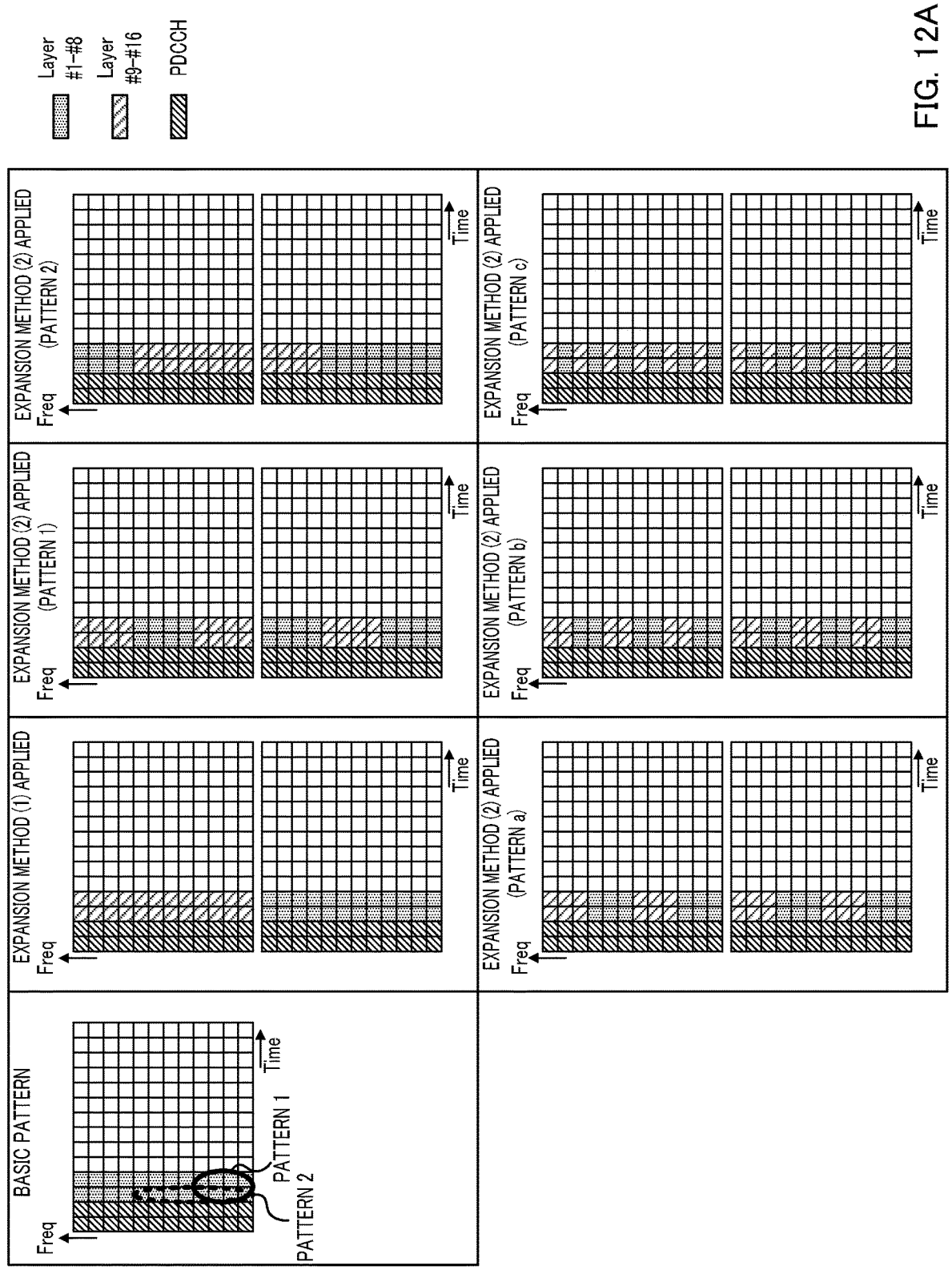
FIG. 12A illustrates a fifth example of the basic pattern and the expansion patterns obtained by applying the expansion methods.
Figure 12B:
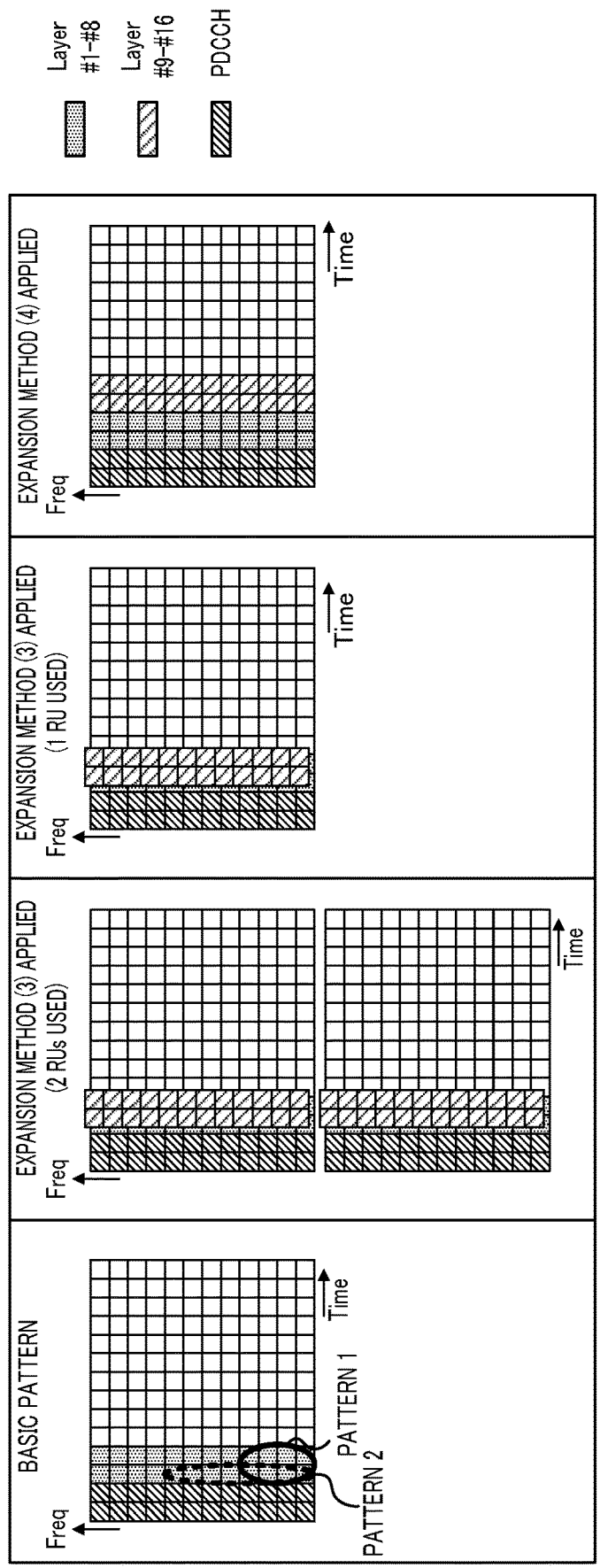
FIG. 12B illustrates the fifth example of the basic pattern and the expansion patterns obtained by applying the expansion methods.
Figure 13:
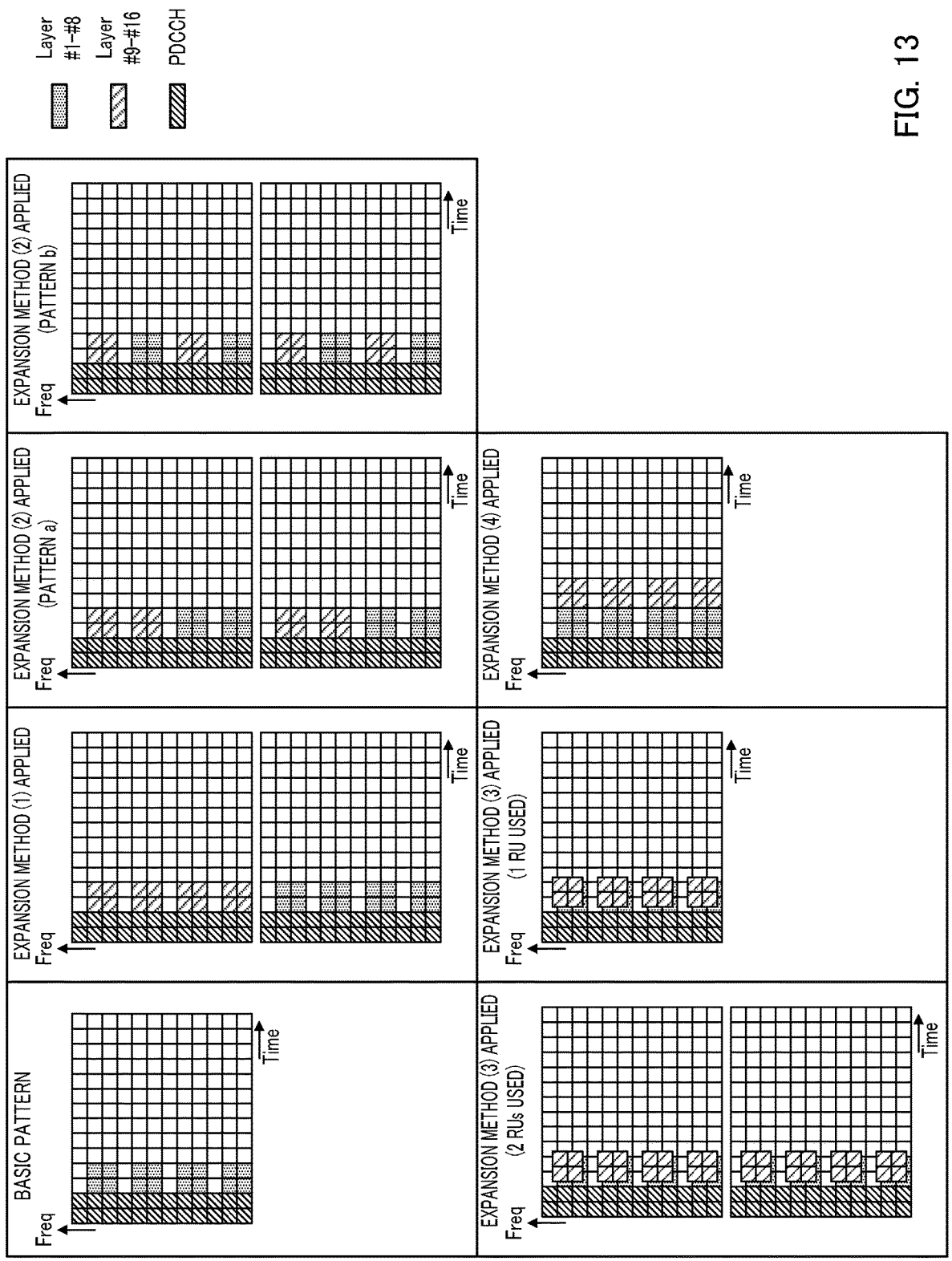
FIG. 13 illustrates a sixth example of the basic pattern and the expansion patterns obtained by applying the expansion methods.
Figure 14A:
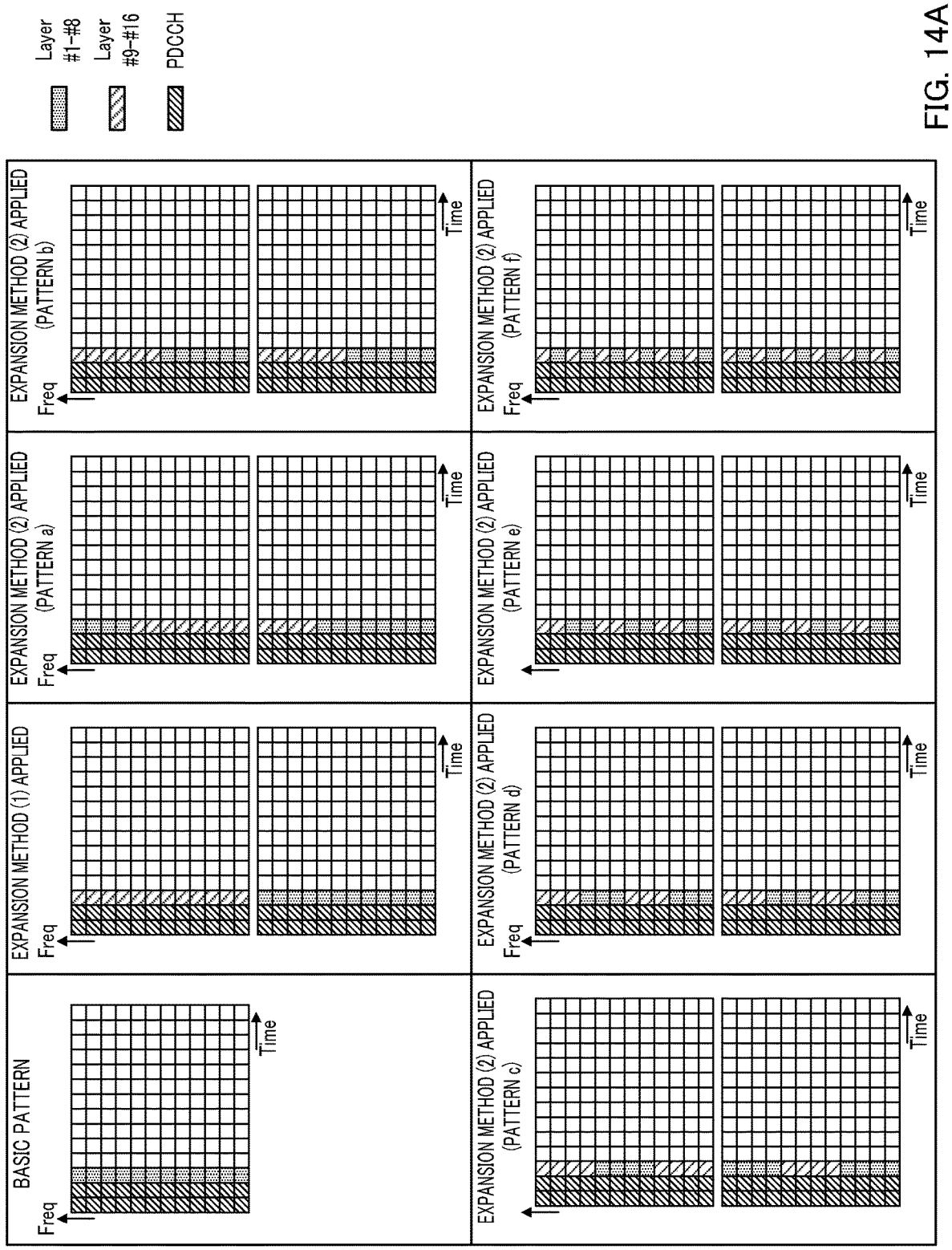
FIG. 14A illustrates a seventh example of the basic pattern and the expansion patterns obtained by applying the expansion methods.
Figure 14B:
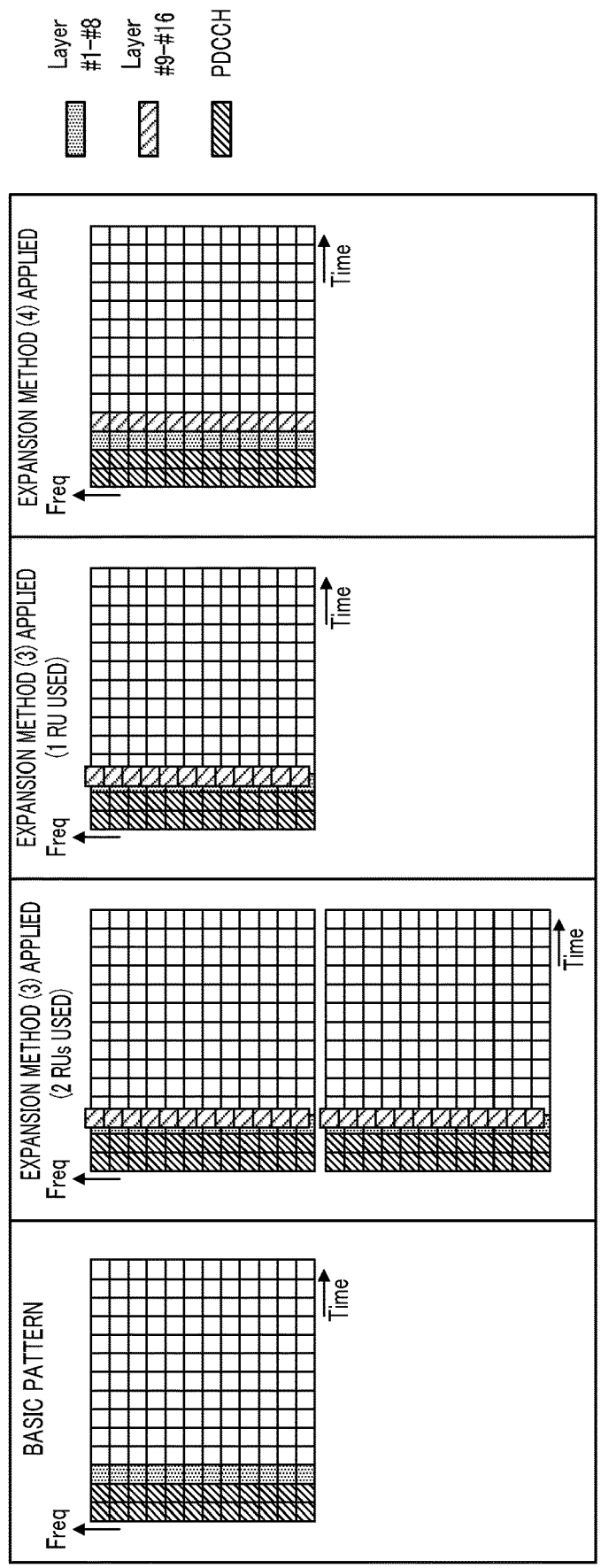
FIG. 14B illustrates the seventh example of the basic pattern and the expansion patterns obtained by applying the expansion methods.

FIGS. 12A and 12B illustrate a fifth example of the basic pattern and the expansion patterns obtained by applying the expansion methods. FIG. 13 illustrates a sixth example of the basic pattern and the expansion patterns obtained by applying the expansion methods. FIGS. 14A and 14B illustrate a seventh example of the basic pattern and the expansion patterns obtained by applying the expansion methods.

FIGS. 12A, 12B, 13, 14A, and 14B illustrate the basic pattern and the expansion patterns obtained by applying expansion method (1) to expansion method (4) to expand the basic pattern. Note that FIGS. 12A and 12B separately illustrate the same basic pattern and the expansion patterns obtained by expanding the basic pattern. Similarly, FIGS. 14A and 14B separately illustrate the same basic pattern and the expansion patterns obtained by expanding the basic pattern. The basic pattern indicates resource elements to which the control channel (PDCCH) and the demodulation RS of the first layer group (Layer #1 to Layer #8) are mapped, and the expansion patterns expanded by applying the expansion methods indicate resource elements to which the control channel (PDCCH), the demodulation RS of the first layer group, and the demodulation RS of the second layer group (Layer #9 to Layer #16) are mapped. A plurality of patterns are illustrated for examples in which a plurality of different patterns are obtained when expansion method (2) is applied.

In the basic patterns illustrated in FIGS. 12A, 12B, 13, 14A, and 14B, the demodulation RS of 8 layers is mapped to more than half of the resource elements in the same symbols. Therefore, as in expansion method (5), the resource elements for mapping the demodulation RS of the first layer group and the demodulation RS of the second layer group in the same symbols become insufficient. Therefore, expansion method (1) to expansion method (4) excluding expansion method (5) are applied to the basic patterns illustrated in FIGS. 12A, 12B, 13, 14A, and 14B.

As shown in FIGS. 12A, 12B, 13, 14A, and 14B, the expansion methods can be applied to expand one basic pattern to various expansion patterns.

Variation 3

For example, when the number of resource elements for mapping the demodulation RS of 8 layers is relatively small (relatively sparse) in the basic pattern, the expansion method of applying expansion method (3) in 1 RU is removed. Hereinafter, an example of applying the expansion methods excluding expansion method (3) in 1 RU will be described.

Figure 15A:
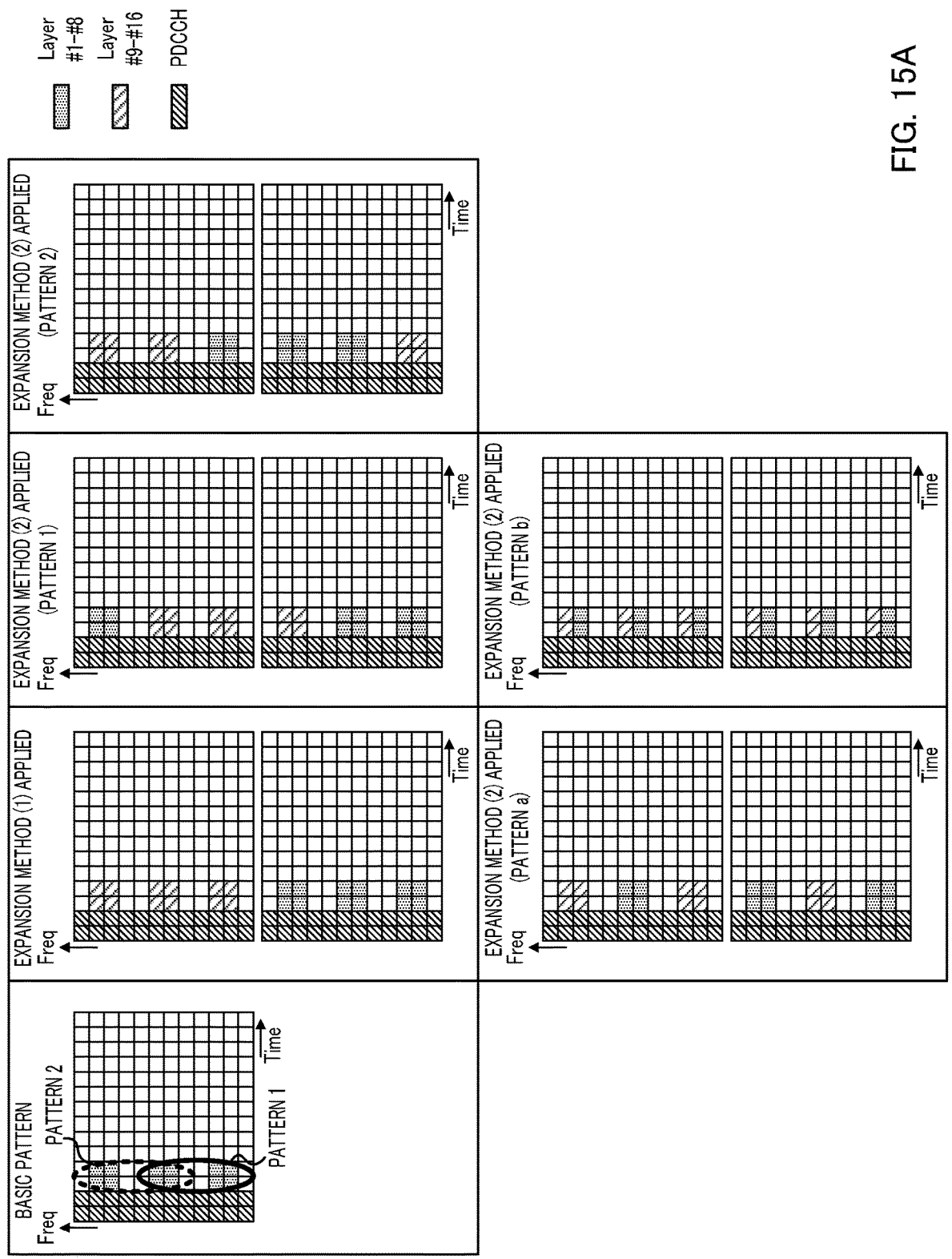
FIG. 15A illustrates an eighth example of the basic pattern and the expansion patterns obtained by applying the expansion methods.
Figure 15B:
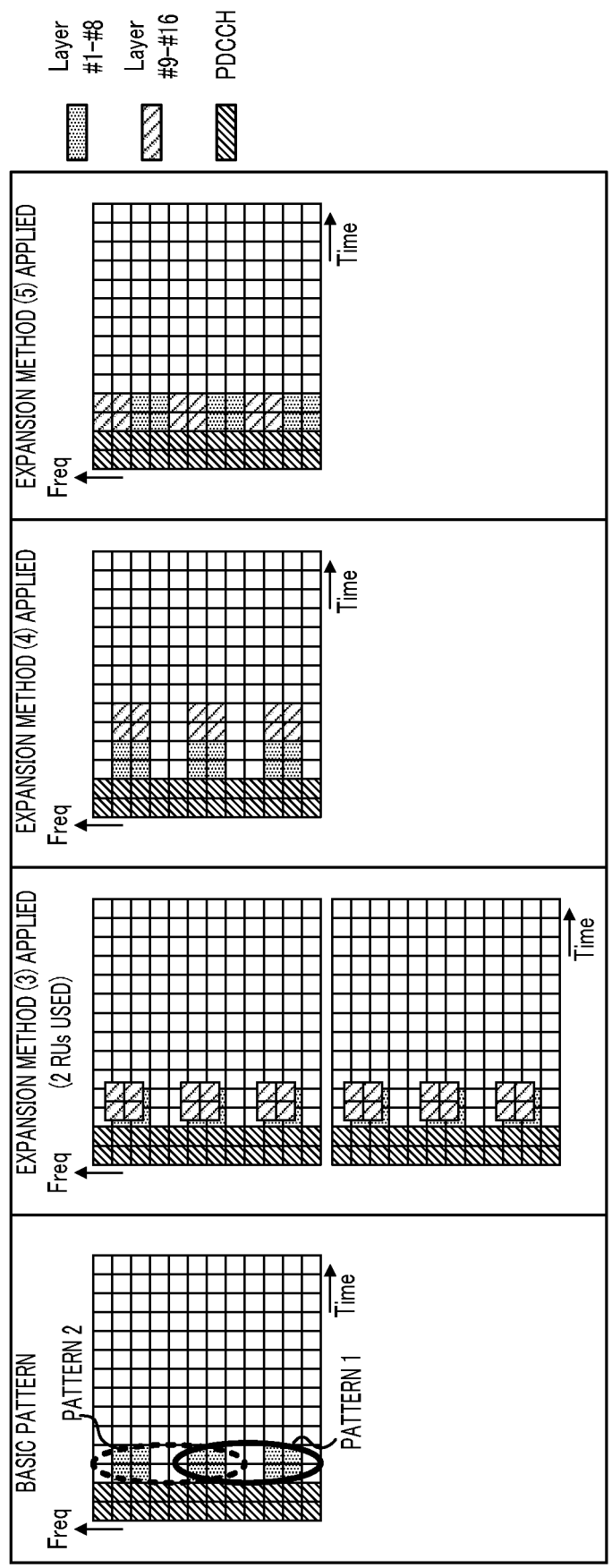
FIG. 15B illustrates the eighth example of the basic pattern and the expansion patterns obtained by applying the expansion methods.
Figure 16:
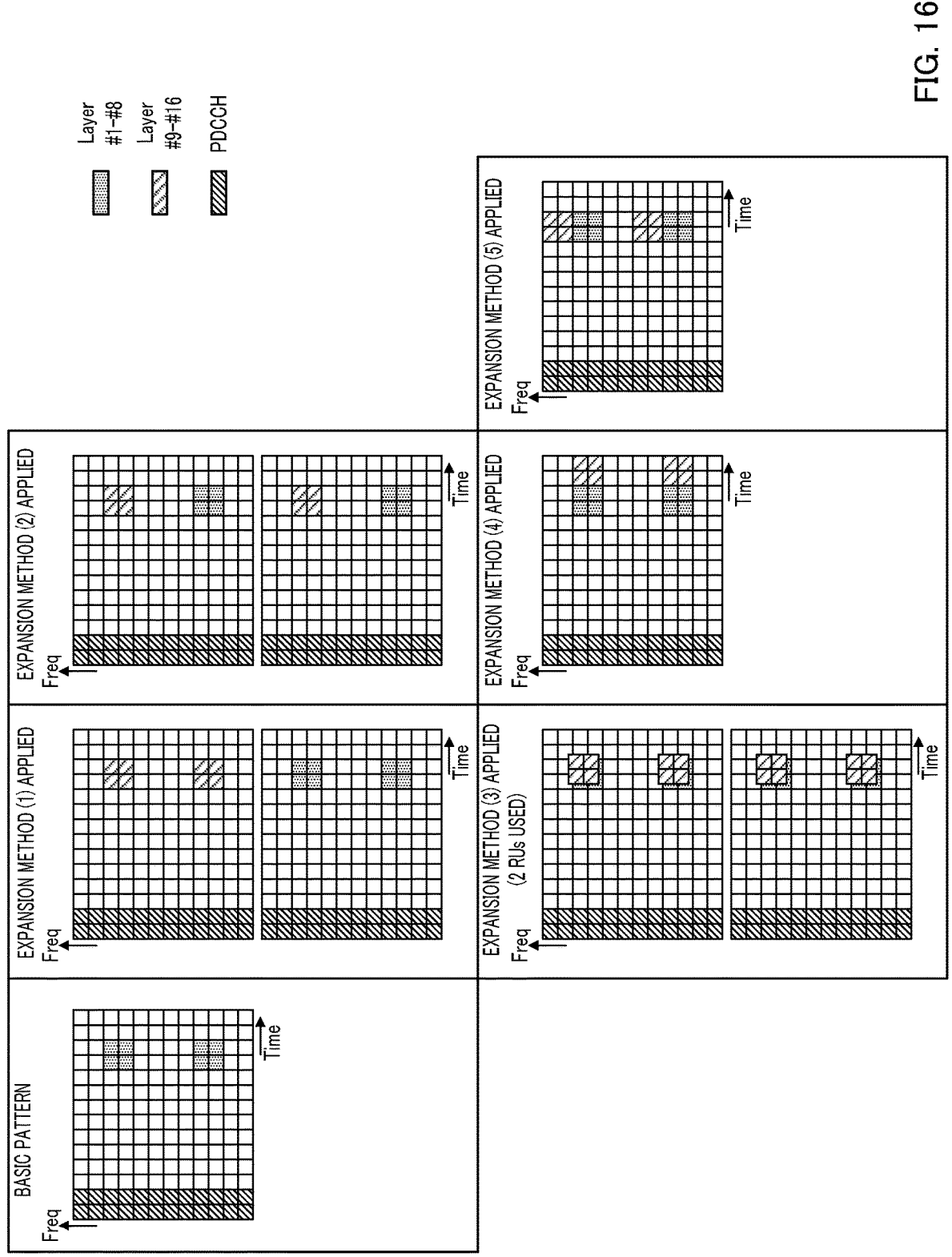
FIG. 16 illustrates a ninth example of the basic pattern and the expansion patterns obtained by applying the expansion methods.
Figure 17:
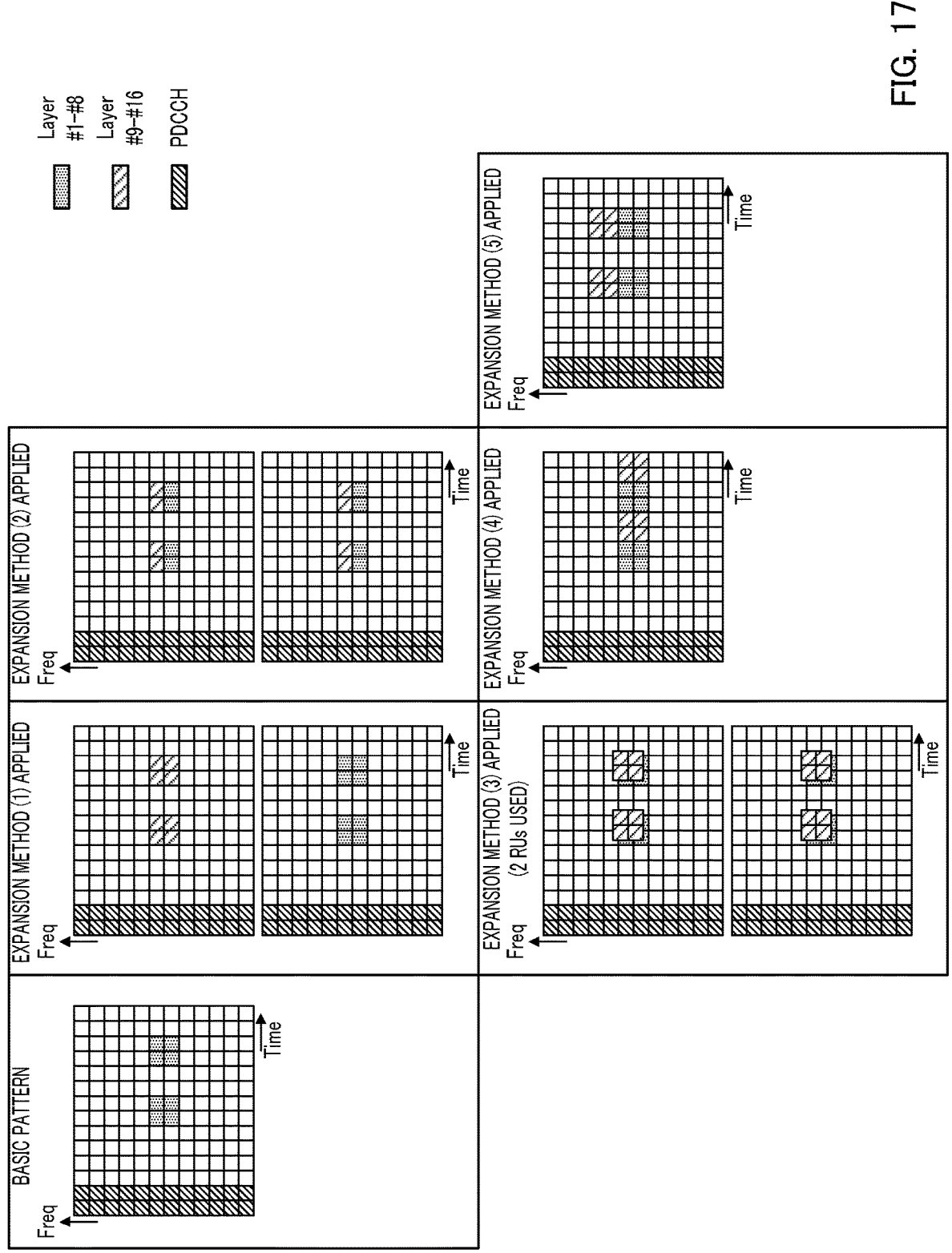
FIG. 17 illustrates a tenth example of the basic pattern and the expansion patterns obtained by applying the expansion methods.
Figure 18:
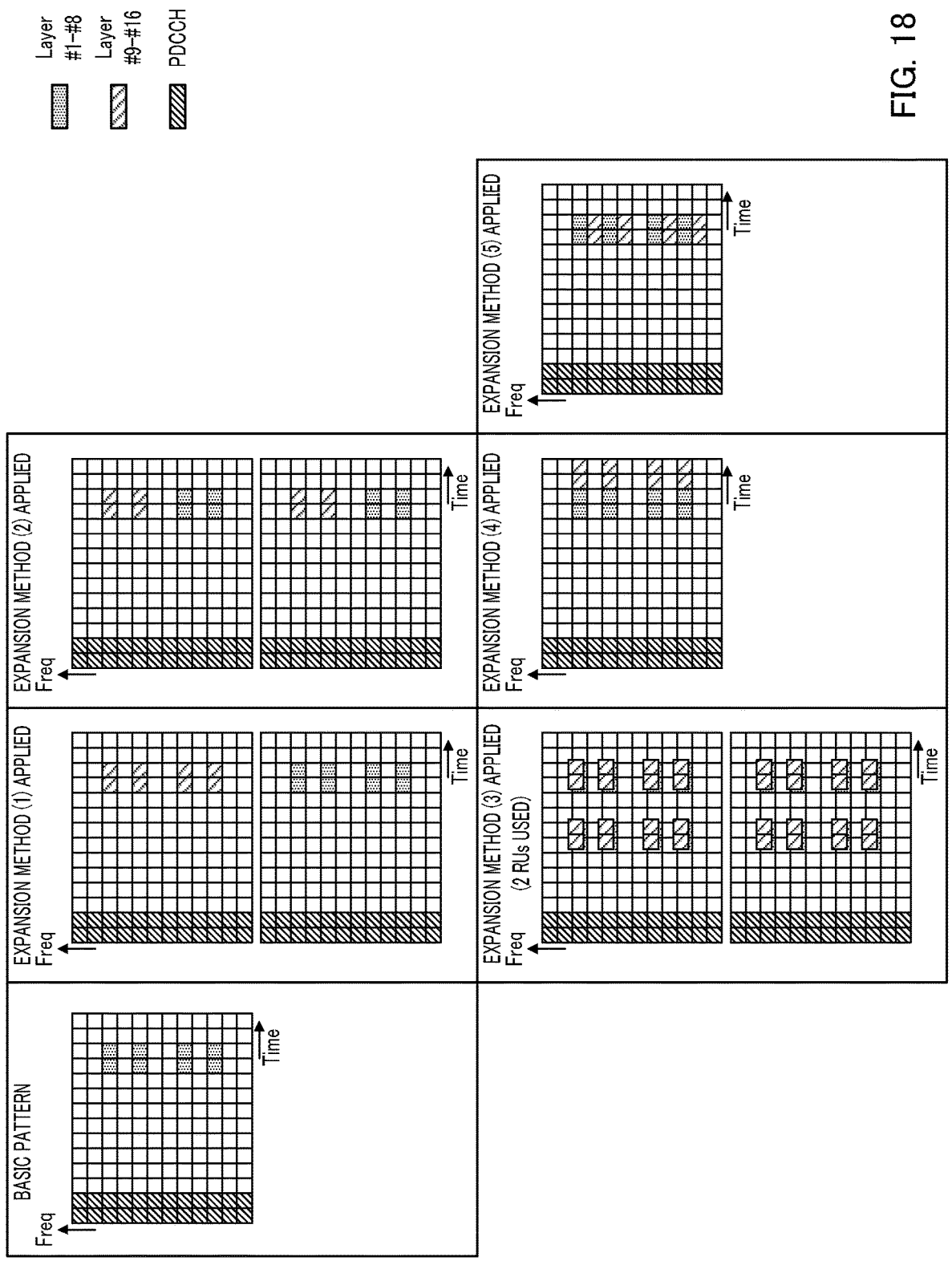
FIG. 18 illustrates an eleventh example of the basic pattern and the expansion patterns obtained by applying the expansion methods.
Figure 19:
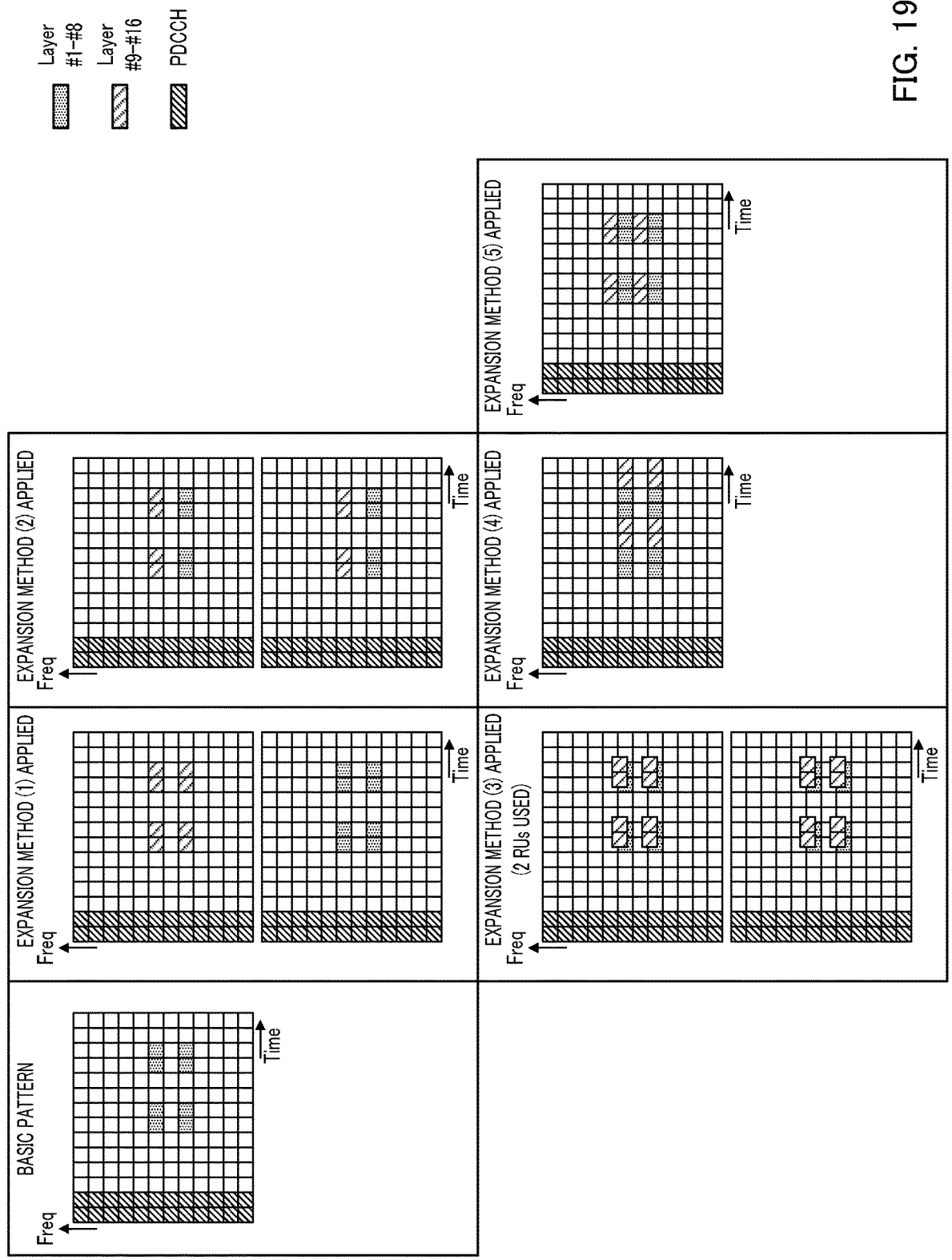
FIG. 19 illustrates a twelfth example of the basic pattern and the expansion patterns obtained by applying the expansion methods.

FIGS. 15A and 15B illustrate an eighth example of the basic pattern and the expansion patterns obtained by applying the expansion methods. FIG. 16 illustrates a ninth example of the basic pattern and the expansion patterns obtained by applying the expansion methods. FIG. 17 illustrates a tenth example of the basic pattern and the expansion patterns obtained by applying the expansion methods. FIG. 18 illustrates an eleventh example of the basic pattern and the expansion patterns obtained by applying the expansion methods. FIG. 19 illustrates a twelfth example of the basic pattern and the expansion patterns obtained by applying the expansion methods.

FIGS. 15A, 15B, and 16 to 19 illustrate the basic pattern and the expansion patterns obtained by applying the expansion methods excluding expansion method (3) in 1 RU to expand the basic pattern. Note that FIGS. 15A and 15B separately illustrate the same basic pattern and the expansion patterns obtained by expanding the basic pattern. The basic pattern indicates resource elements to which the control channel (PDCCH) and the demodulation RS of the first layer group (Layer #1 to Layer #8) are mapped. The expansion patterns expanded by applying expansion method (5) indicate resource elements the control channel (PDCCH), the demodulation RS of the first layer group, and the demodulation RS of the second layer group (Layer #9 to Layer #16) are mapped. A plurality of patterns are illustrated for the examples in which a plurality of different patterns are obtained when expansion method (2) is applied.

Since the number of resource elements for mapping the demodulation RS of 8 layers is relatively small in the basic patterns shown in FIGS. 15A, 15B, and 16 to 19, the CDM cannot be used to multiplex the demodulation RS of 16 layers with the resource elements indicated by the basic pattern. Therefore, the expansion methods excluding expansion method (3) in 1 RU are applied to the basic patterns shown in FIGS. 15A, 15B, and 16 to 19.

As shown in FIGS. 15A, 15B, and 16 to 19, the expansion methods can be applied to one basic pattern to expand the basic pattern to various expansion patterns.

Note that the basic patterns illustrated in FIGS. 9A to 19 are just illustrative, and the basic patterns used in the present invention are not limited to these. The expansion patterns are also just illustrative, and the expansion patterns in the present invention are not limited to these.

This completes the description of the expansion methods of the mapping patterns in the present embodiment and the variations of the basic patterns and the expansion patterns.

Although radio base station 10 uses the preset expansion method to expand the basic pattern in the examples described in the embodiment, radio base station 10 may select one of a plurality of expansion methods to configure the selected expansion method.

Note that a common expansion method of the mapping pattern may be set to user terminals 20 positioned in the same cell, or different expansion methods may be set to user terminals 20. Different expansion methods may be set to user terminals 20 positioned in different cells.

Furthermore, the expansion method to be applied may be set according to the data channel. For example, the expansion method applied to the mapping pattern for mapping the demodulation RS of the subframe including a specific data channel may be a predefined expansion method. Examples of the specific data channel include a data channel including System Information, a data channel including SRB (Signaling Radio Bearer), a data channel including Hand over command, a data channel scheduled by using DCI (Downlink Control Information) transmitted by Common search space, and a data channel including Activation command.

Furthermore, the expansion methods and/or the control methods applied to the broadcast channel (for example, channel for broadcast, such as PBCH, and channel for notification), the control channel (for example, PDCCH), and the data channel (for example, PDSCH) may be independently set or collectively set. When the expansion methods applied to the broadcast channel, the control channel, and the data channel are collectively set, a plurality of indices provided to the expansion methods may be notified. One index may be collectively set for a plurality of expansion methods, and one index may be notified.

When the value that can boost the demodulation RS is variable, radio base station 10 may send out the value for boosting, or user terminal 20 may implicitly determine the value. When radio base station 10 sends out the value for boosting, the value to be notified may be an index value associated with the boost value or an index value associated with a plurality of boost value candidates.

Although radio base station 10 applies the preset expansion methods to the basic patterns in the example described in the embodiment, radio base station 10 may select one of a plurality of expansion methods and apply the selected expansion method. In this case, the selected expansion method is indicated to user terminal 20.

Next, notification methods of the expansion method for user terminal 20 will be described.

Radio base station 10 may explicitly or implicitly notify user terminal 20 of the information indicating the expansion method.

For example, when the expansion method is to be explicitly notified, radio base station 10 may notify user terminal 20 of the expansion method by using RRC (Radio Resource Control) signaling, MAC (Medium Access Control) signaling, PHY (physical layer) signaling, or the like. For example, radio base station 10 may notify user terminal 20 of the expansion method by using MIB (Master Information Block) transmitted by using PBCH, RACH message 2 (Random Access Response; also called RAR in some cases) used in random access processing, RACH message 3, RACH message 4, SIB (System Information Block), RRC, DCI (Downlink Control Information), or the like.

When the expansion method is to be implicitly notified, radio base station 10 and user terminal 20 may associate the configuration or the like of synchronization signal (SS), PBCH, SIB, or RACH one-to-one with the expansion methods (for example, expansion methods (1) to (5)). For example, when a plurality of patterns are defined for the configuration of each of SS, PBCH, SIB, and RACH, the plurality of patterns may be grouped into groups associated with the expansion methods. In the grouping, the expansion method suitable for the communication environment in using the pattern may be associated with each pattern (for example, each pattern with different subcarrier intervals of SS).

Radio base station 10 transmits, to user terminal 20, a signal of the group associated with the expansion method set to user terminal 20. User terminal 20 then specifies, as an expansion method set to user terminal 20, the expansion method associated with the group to which the signal transmitted from radio base station 10 belongs. In this way, the expansion method is implicitly notified by an existing signal, and new signaling for notifying the expansion method is not necessary.

In another method of implicitly notifying the expansion method, radio base station 10 applies one of the plurality of expansion methods to expand the basic pattern, maps the demodulation RS based on the expansion pattern, and transmits the demodulation RS to user terminal 20. User terminal 20 may execute estimation processing (blind estimation) by assuming that the demodulation RS is mapped to the symbols to which the demodulation RS may be mapped for each of the plurality of expansion methods and specify the symbols to which the demodulation RS is mapped. As a result, new signaling for notifying the expansion method is not necessary.

Note that radio base station 10 may periodically or dynamically notify user terminal 20 of the expansion method.

A combination or one of the expansion method and the basic pattern applied with the expansion method may be indicated to user terminal 20. Alternatively, an index indicating the expansion pattern expanded by applying the expansion method to the basic pattern may be indicated to user terminal 20.

In the present embodiment, the sequence generation procedure of the demodulation RS is also not particularly limited. For example, a PN (Pseudo Noise) sequence may be generated from sequence seeds including one or a combination of a plurality of PCID (Physical Cell Identities), VCID (Virtual Cell Identities), and UE-ID (User Equipment Identities), and the PN sequence may be used to generate the demodulation RS. Alternatively, another sequence, such as a Zadoff-Chu sequence, may be used instead of the PN sequence to generate the demodulation RS.

Note that the demodulation RS may be called DMRS. The demodulation RS may also be called a reference signal, RS, or the like.

The downlink communication from radio base station 10 to user terminal 20 is described above. However, the embodiment may also be applied to the uplink communication from user terminal 20 to radio base station 10. In this case, the configuration of radio base station 10 (configuration on the transmission side of the demodulation RS of the DL signal) shown in FIG. 1 may be replaced with the configuration of the user terminal in the uplink, and the configuration of user terminal 20 (configuration on the reception side of the demodulation RS of the DL signal) shown in FIG. 2 may be replaced with the configuration of the radio base station in the uplink.

In the case of the uplink, the radio base station specifically notifies the user terminal of an index indicating a predefined or selected expansion method. The user terminal then maps the demodulation RS of the UL signal to the radio resources based on the expansion pattern obtained by applying the predefined expansion method or the expansion method indicated by the index indicated from the radio base station to expand the basic pattern and transmits the demodulation RS to the radio base station. The radio base station separates (demaps) the demodulation RS from the UL signal based on the expansion pattern obtained by applying the selected expansion method to expand the basic pattern and uses the separated demodulation RS to perform the channel estimation.

Although the radio base station selects the expansion method in the case of the uplink in the example described above, the user terminal may select the expansion method. In this case, the user terminal notifies the radio base station of the index indicating the selected mapping pattern. The user terminal then maps the demodulation RS of the UL signal to the radio resources based on the expansion pattern obtained by applying the selected expansion method to expand the basic pattern and transmits the demodulation RS to the radio base station. The radio base station separates (demaps) the demodulation RS from the UL signal based on the expansion pattern obtained by applying the expansion method indicated by the index indicated from the terminal to expand the basic pattern and uses the separated demodulation RS to perform the channel estimation.

Although the demodulation RS is expanded to 16 ports in the examples described above, part of the demodulation RS (DMRS) may be expanded to 16 ports.

For example, only Basic DMRS (Front-loaded DMRS) may be expanded to 16 ports, and Additional DMRS may remain at 8 ports without expansion.

Alternatively, the demodulation RS may be expanded to 16 ports when 16-layer multiplexing is performed in SU-MIMO (Single-User Multiple-Input Multiple-Output), and the demodulation RS may not be expanded to 16 ports when the number of layers of each user is equal to or smaller than 8 layers in MU-MIMO (Multi-User Multiple-Input Multiple-Output). In this case, the beams may be multiplexed between the users.

The demodulation RS expanded to 16 ports that is to be transmitted and received may be predefined or may be switched according to the situation. When the demodulation RS is switched, a notification method similar to the notification method of the expansion method may be used.

Advantageous Effects of Present Embodiment

In the present embodiment, when the number of antenna ports is expanded from 8 ports to 16 ports, an appropriate expansion method can be applied to expand a mapping pattern of the demodulation RS that supports transmission and reception of 8 ports to configure a mapping pattern of the demodulation RS that supports transmission and reception of 16 ports. User terminal 20 separates the demodulation RS based on the mapping pattern of the demodulation RS that supports transmission and reception of 16 ports and uses the demodulation RS to demodulate the data signal.

According to the present embodiment, the configuration of the reference signal and the like suitable for the expansion of the number of ports in the future radio communication system can be realized by using the method, and user terminal 20 can handle the expansion of the number of ports in the future radio communication system.

According to the present embodiment, when the expansion method from the basic pattern to the expansion pattern is predefined or when the expansion method is implicitly indicated in association with an existing signal, new signaling for indicating the expansion method is not necessary, and an increase in the signaling overhead can be prevented.

This completes the description of the embodiment of the present invention.

Hardware Configuration

Note that the block diagrams used to describe the embodiments illustrate blocks on the basis of functions. The functional blocks (constituent sections) are realized by an arbitrary combination of hardware and/or software. Means for realizing the functional blocks is not particularly limited. More specifically, the functional blocks may be realized by one physically and/or logically coupled apparatus. Two or more physically and/or logically separated apparatuses may be directly and/or indirectly (for example, wired and/or wireless) connected, and the plurality of apparatuses may realize the functional blocks.

Figure 20:
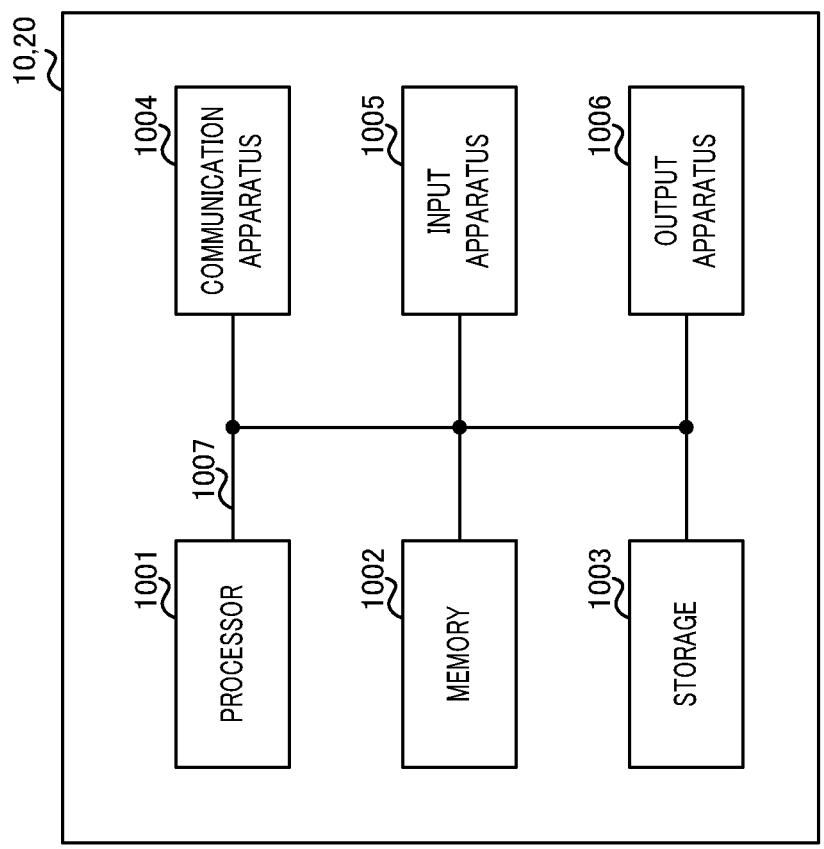
FIG. 20 illustrates an example of a hardware configuration of the radio base station and the user terminal according to an embodiment of the present invention.

For example, the radio base station, the user terminal, and the like according to one embodiment of the present invention may function as a computer that executes processing of a radio communication method of the present invention. FIG. 20 illustrates an example of a hardware configuration of the radio base station and the user terminal according to one embodiment of the present invention. Radio base station 10 and user terminal 20 may be physically constituted as a computer apparatus including processor 1001, memory 1002, storage 1003, communication apparatus 1004, input apparatus 1005, output apparatus 1006, bus 1007, and the like.

Note that the term "apparatus" in the following description can be replaced with a circuit, a device, a unit, or the like. The hardware configurations of radio base station 10 and user terminal 20 may include one or a plurality of apparatuses illustrated in the drawings or may not include part of the apparatuses.

For example, although only one processor 1001 is illustrated, there may be a plurality of processors. The processing may be executed by one processor, or the processing may be executed by one or more processors at the same time, in succession, or by other methods. Note that processor 1001 may be provided by one or more chips.

The functions of radio base station 10 and user terminal 20 are realized by loading predetermined software (program) on the hardware of processor 1001, memory 1002, or the like. Processor 1001 performs operation, and the communication by communication apparatus 1004 or reading and/or writing of data in memory 1002 and storage 1003 is controlled.

Processor 1001 operates, for example, an operating system to control the entire computer. Processor 1001 may be constituted by a central processing unit (CPU) including an interface for peripheral apparatus, a control apparatus, an operation apparatus, a register, and the like. For example, scheduler 101, control sections 108 and 203, transmission signal generation sections 102 and 205, coding and modulation sections 103 and 206, mapping sections 104 and 207, demodulation and decoding sections 109 and 204, and the like may be realized by processor 1001.

Processor 1001 executes various types of processing according to a program (program code), a software module, or data loaded from storage 1003 and/or communication apparatus 1004 to memory 1002. The program used is a program for causing the computer to execute at least part of the operation described in embodiments. For example, scheduler 101 of radio base station 10 may be realized by a control program stored in memory 1002 and operated by processor 1001, and the other functional blocks may also be realized in the same way. Although the various types of processing are executed by one processor 1001 in the description, the various types of processing may be executed by two or more processors 1001 at the same time or in succession. Processor 1001 may be provided by one or more chips. Note that the program may be transmitted from a network through a telecommunication line.

Memory 1002 is a computer-readable recording medium and may be constituted by, for example, at least one of a ROM (Read Only Memory), an EPROM (Erasable Programmable ROM), an EEPROM (Electrically Erasable Programmable ROM), and a RAM (Random Access Memory). Memory 1002 may be called a register, a cache, a main memory (main storage apparatus), or the like. Memory 1002 can save a program (program code), a software module, and the like that can be executed to carry out the radio communication method according to one embodiment of the present invention.

Storage 1003 is a computer-readable recording medium and may be constituted by, for example, at least one of an optical disk such as a CD-ROM (Compact Disc ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, and a magnetic strip. Storage 1003 may be called an auxiliary storage apparatus. The storage medium may be, for example, a database, a server, or other appropriate media including memory 1002 and/or storage 1003.

Communication apparatus 1004 is hardware (transmission and reception device) for communication between computers through a wired and/or wireless network and is also called, for example, a network device, a network controller, a network card, or a communication module. For example, transmission sections 105 and 208, antennas 106 and 201, reception sections 107 and 202, and the like may be realized by communication apparatus 1004.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) for output to the outside. Note that input apparatus 1005 and output apparatus 1006 may be integrated (for example, a touch panel).

The apparatuses, such as processor 1001 and memory 1002, are connected by bus 1007 for communication of information. Bus 1007 may be set by a single bus or may be set by different buses between the apparatuses.

Furthermore, radio base station 10 and user terminal 20 may include hardware, such as a microprocessor, a digital signal processor (DSP), an ASIC (Application Specific Integrated Circuit), a PLD (Programmable Logic Device), and an FPGA (Field Programmable Gate Array), and the hardware may realize part or all of the functional blocks. For example, processor 1001 may be provided by at least one of these pieces of hardware.

Notification and Signaling of Information

The notification of information is not limited to the modes and embodiments described in the present specification, and the information may be notified by other methods. For example, the notification of information may be carried out by one or a combination of physical layer signaling (for example, DCI (Downlink Control Information) and UCI (Uplink Control Information)), higher layer signaling (for example, RRC (Radio Resource Control) signaling, MAC (Medium Access Control) signaling, broadcast information (MIB (Master Information Block), and SIB (System Information Block))), and other signals. The RRC signaling may be called an RRC message and may be, for example, an RRC connection setup message, an RRC connection reconfiguration message, or the like.

Adaptive System

The aspects and embodiments described in the present specification may be applied to a system using LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other appropriate systems and/or to a next-generation system expanded based on these.

Processing Procedure and the Like

The orders of the processing procedures, the sequences, the flow charts, and the like of the aspects and embodiments described in the present specification may be changed as long as there is no contradiction. For example, elements of various steps are presented in exemplary orders in the methods described in the present specification, and the methods are not limited to the presented specific orders.

Operation of Base Station

Specific operations performed by the base station (radio base station) in the specification may be performed by an upper node depending on the situation. Various operations performed for communication with a terminal in a network constituted by one or a plurality of network nodes including a base station can be obviously performed by the base station and/or a network node other than the base station (examples include, but not limited to, MME (Mobility Management Entity) and S-GW (Serving Gateway)). Although there is one network node other than the base station in the case illustrated above, a plurality of other network nodes may be combined (for example, MME and S-GW).

Direction of Input and Output

The information, the signals, and the like can be output from a higher layer (or a lower layer) to a lower layer (or a higher layer). The information, the signals, and the like may be input and output through a plurality of network nodes.

Handling of Input and Output Information and the Like

The input and output information and the like may be saved in a specific place (for example, memory) or may be managed by a management table. The input and output information and the like can be overwritten, updated, or additionally written. The output information and the like may be deleted. The input information and the like may be transmitted to another apparatus.

Judgement Method

The judgement may be made based on a value expressed by 1 bit (0 or 1), based on a Boolean value (true or false), or based on comparison with a numerical value (for example, comparison with a predetermined value).

Software

Regardless of whether the software is called software, firmware, middleware, a microcode, or a hardware description language or by other names, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and the like.

The software, the instruction, and the like may be transmitted and received through a transmission medium. For example, when the software is transmitted from a website, a server, or other remote sources by using a wired technique, such as a coaxial cable, an optical fiber cable, a twisted pair, and a digital subscriber line (DSL), and/or a wireless technique, such as an infrared ray, a radio wave, and a microwave, the wired technique and/or the wireless technique is included in the definition of the transmission medium.

Information and Signals

The information, the signals, and the like described in the present specification may be expressed by using any of various different techniques. For example, data, instructions, commands, information, signals, bits, symbols, chips, and the like that may be mentioned throughout the entire description may be expressed by one or an arbitrary combination of voltage, current, electromagnetic waves, magnetic fields, magnetic particles, optical fields, and photons.

Note that the terms described in the present specification and/or the terms necessary to understand the present specification may be replaced with terms with the same or similar meaning. For example, the channel and/or the symbol may be a signal. The signal may be a message. The component carrier (CC) may be called a carrier frequency, a cell, or the like.

"System" and "Network"

The terms "system" and "network" used in the present specification can be interchangeably used.

Names of Parameters and Channels

The information, the parameters, and the like described in the present specification may be expressed by absolute values, may be expressed by values relative to predetermined values, or expressed by other corresponding information. For example, radio resources may be indicated by indices.

The names used for the parameters are not limited in any respect. Furthermore, the numerical formulas and the like using the parameters may be different from the ones explicitly disclosed in the present specification. Various channels (for example, PUCCH and PDCCH) and information elements (for example, TPC) can be identified by any suitable names, and various names assigned to these various channels and information elements are not limited in any respect.

Base Station

The base station (radio base station) can accommodate one or a plurality of (for example, three) cells (also called sectors). When the base station accommodates a plurality of cells, the entire coverage area of the base station can be divided into a plurality of smaller areas, and each smaller area can provide a communication service based on a base station subsystem (for example, small base station for indoor, RRH: Remote Radio Head). The term "cell" or "sector" denotes the base station that performs the communication service in the coverage and/or part or all of the coverage area of the base station subsystem. Furthermore, the terms "base station," "eNB," "cell," and "sector" can be interchangeably used in the present specification. The base station may be called a fixed station, a NodeB, an eNodeB (eNB), an access point, a femto cell, a small cell, or the like.

Terminal

The user terminal may be called, by those skilled in the art, a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or UE (User Equipment) or by some other appropriate terms.

Meaning and Interpretation of Terms

As used herein, the term "determining" may encompasses a wide variety of actions. For example, "determining" may be regarded as judging, calculating, computing, processing, deriving, investigating, looking up (e.g., looking up in a table, a database or another data structure), ascertaining and the like. Also, "determining" may be regarded as receiving (e.g., receiving information), transmitting (e.g., transmitting information), inputting, outputting, accessing (e.g., accessing data in a memory) and the like. Also, "determining" may be regarded as resolving, selecting, choosing, establishing and the like. That is, "determining" may be regarded as a certain type of action related to determining.

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. When used in the present specification, two elements can be considered to be "connected" or "coupled" to each other by using one or more electrical wires, cables, and/or printed electrical connections or by using electromagnetic energy, such as electromagnetic energy with a wavelength of a radio frequency domain, a microwave domain, or an optical (both visible and invisible) domain that are non-limited and non-inclusive examples.

The reference signal can also be abbreviated as RS and may also be called a pilot depending on the applied standard. The demodulation RS may be called by other corresponding names.

The description "based on" used in the present specification does not mean "only based on," unless otherwise specifically stated. In other words, the description "based on" means both of "only based on" and "at least based on."

The "section" in the configuration of each apparatus may be replaced with "means," "circuit," "device," or the like.

The terms "including," "comprising," and modifications of these are intended to be inclusive just like the term "having," as long as the terms are used in the present specification or the appended claims. Furthermore, the term "or" used in the present specification or the appended claims is not intended to be an exclusive or.

The radio frame may be constituted by one or a plurality of frames in the time domain. One or each of a plurality of frames may be called a subframe, a time unit, or the like in the time domain. The subframe may be further constituted by one or a plurality of slots in the time domain. The slot may be further constituted by one or a plurality of symbols (OFDM (Orthogonal Frequency Division Multiplexing) symbols, SC-FDMA (Single Carrier-Frequency Division Multiple Access) symbols, or the like) in the time domain.

The radio frame, the subframe, the slot, the mini slot, and the symbol indicate time units in transmitting signals. The radio frame, the subframe, the slot, the mini slot, and the symbol may be called by other corresponding names.

For example, in the LTE system, the base station performs a scheduling for assigning radio resources to each mobile station (such as frequency bandwidth that can be used by each mobile station and transmission power). The minimum time unit of scheduling may be called a TTI (Transmission Time Interval).

For example, one subframe may be called a TTI. A plurality of continuous subframes may be called a TTI. One slot may be called a TTI. One mini slot may be called a TTI.

The resource unit is a resource assignment unit of the time domain and the frequency domain, and the resource unit may include one or a plurality of continuous subcarriers in the frequency domain. One or a plurality of symbols may be included in the time domain of the resource unit, and the length may be one slot, one mini slot, one subframe, or one TTI. One TTI and one subframe may be constituted by one or a plurality of resource units. The resource unit may be called a resource block (RB), a physical resource block (PRB: Physical RB), a PRB pair, an RB pair, a scheduling unit, a frequency unit, or a subband. The resource unit may be constituted by one or a plurality of REs. For example, it is only necessary that one RE be a resource in a unit (for example, minimum resource unit) smaller than the resource unit serving as a resource assignment unit, and the naming is not limited to RE.

The structure of the radio frame is illustrative only, and the number of subframes included in the radio frame, the number of slots included in the subframe, the number of mini slots included in the subframe, the numbers of symbols and resource blocks included in the slot, and the number of subcarriers included in the resource block can be changed in various ways.

When articles, such as "a," "an," and "the" in English, are added by translation in the entire disclosure, the articles include plural forms unless otherwise clearly indicated by the context.

Variations and the Like of Aspects

The aspects and embodiments described in the present specification may be independently used, may be combined and used, or may be switched and used along the execution. Furthermore, notification of predetermined information (for example, notification indicating "it is X") is not limited to explicit notification, and the notification of the predetermined information may be implicit (for example, by not notifying the predetermined information).

Although the present invention has been described in detail, it is obvious for those skilled in the art that the present invention is not limited to embodiments described in the present specification. Modified and changed modes of the present invention can be carried out without departing from the spirit and the scope of the present invention defined by the description of the appended claims. Therefore, the description of the present specification is intended for exemplary description and does not limit the present invention in any sense.

The present patent application claims the benefit of priority based on Japanese Patent Application No. 2017-019119 filed on Feb. 3, 2017, and the entire content of Japanese Patent Application No. 2017-019119 is hereby incorporated by reference.

INDUSTRIAL APPLICABILITY

An aspect of the present invention is useful for a mobile communication system.

REFERENCE SIGNS LIST

10 Radio base station
20 User terminal
101 Scheduler
108, 203 Control section
102, 205 Transmission signal generation section
103, 206 Coding and modulation section
104, 207 Mapping section
105, 208 Transmission section
106, 201 Antenna
107, 202 Reception section
109, 204 Demodulation and decoding section

The invention claimed is:
1. A user terminal comprising:
a reception section that receives a downlink signal including a demodulation reference signal; and
a control section that controls the reception of the demodulation reference signal from the downlink signal based on an expansion pattern obtained by applying a set expansion method to expand a basic pattern, wherein
the basic pattern indicates first resource elements to which a demodulation reference signal of a first layer group of layer 1 to 8 is mapped,
the expansion pattern indicates the first resource elements and second resource elements to which a demodulation reference signal of a second layer group of layer 9 to 16 is mapped, the expansion method indicates a method of multiplexing between the demodulation reference signal of the first layer group and the demodulation reference signal of the second layer group, the expansion method is indicated to the user terminal, and the control section specifies the second resource elements based on the set expansion method and the first resource elements.

2. The user terminal according to claim 1, wherein the expansion pattern indicates the first resource elements are included in a first Resource Unit (RU) and the second resource elements are included in a second RU.

3. A radio communication method for a user terminal comprising:

receiving a downlink signal including a demodulation reference signal; and controlling the reception of the demodulation reference signal from the downlink signal based on an expansion pattern obtained by applying a set expansion method to expand a basic pattern, wherein the basic pattern indicates first resource elements to which a demodulation reference signal of a first layer group of layer 1 to 8 is mapped, the expansion pattern indicates the first resource elements and second resource elements to which a demodulation reference signal of a second layer group of layer 9 to 16 is mapped, the expansion method indicates a method of multiplexing between the demodulation reference signal of the first layer group and the demodulation reference signal of the second layer group, the expansion method is indicated to the user terminal, and specifying the second resource elements based on the set expansion method and the first resource elements.

\* \* \* \* \*